(12) United States Patent
Sauermann et al.

(10) Patent No.: US 8,074,206 B2
(45) Date of Patent: Dec. 6, 2011

(54) METHOD AND COMPUTER SYSTEM FOR SOFTWARE TUNING

(75) Inventors: Volker Sauermann, Heidelberg (DE);
Axel Von Bergen, Wiesloch (DE); Arne Schwarz, Walldorf (DE)

(73) Assignee: SAP AG, Walldorf (DE)

( * ) Notice: Subject to any disclaimer, the term of this patent is extended or adjusted under 35 U.S.C. 154(b) by 1202 days.

(21) Appl. No.: 10/563,568

(22) PCT Filed: Jul. 7, 2004

(86) PCT No.: PCT/EP2004/051381
§ 371 (c)(1),
(2), (4) Date: Oct. 30, 2006

(87) PCT Pub. No.: WO2005/006214
PCT Pub. Date: Jan. 20, 2005

(65) Prior Publication Data
US 2007/0044082 A1     Feb. 22, 2007

(30) Foreign Application Priority Data

Jul. 8, 2003   (EP) .................................... 30153662

(51) Int. Cl.
*G06F 9/44* (2006.01)

(52) U.S. Cl. ...................................................... 717/130

(58) Field of Classification Search .................. 707/600, 707/999.1, 999.104; 706/13, 20, 12, 50; 717/100, 108, 119, 126, 130–149
See application file for complete search history.

(56) References Cited

U.S. PATENT DOCUMENTS

| 5,848,408 | A    | 12/1998 | Jakobsson et al. |
| 6,205,441 | B1   | 3/2001  | Al-omari et al. |
| 7,171,427 | B2 * | 1/2007  | Witkowski et al. .................. 1/1 |
| 7,194,483 | B1 * | 3/2007  | Mohan et al. ................. 707/600 |
| 7,206,778 | B2 * | 4/2007  | Bode et al. ............................ 1/1 |

FOREIGN PATENT DOCUMENTS

| EP | 1496450    | 1/2005 |
| WO | WO-0120501 | 3/2001 |

OTHER PUBLICATIONS

Ming-Chuan Wu, "Encoded Bitmap Indexes and Their Use for Data Warehouse Optimization", D17, Darmstadt Dissertation, Jan. 2001, pp. 1-223 <$dissert_{13}$ Wu2001.pdf>.*
"Search Report for PCT/EP2004/051381", (Sep. 23, 2004),3 pgs.
Lee, Y. H., et al., "Adaptive Access Plan for Select Queries With Multiple Predicates", *IBM Technical Disclosure Bulletin*32(8B), (Jan. 1990), 6-10.
Shibamiya, A. , et al., "DB2 Cost Formula", *IBM Technical Disclosure Bulletin*, 34(12), (389-394),May 1992.
Suzaki, K, et al., "Adaptive algorithm selection method (AASM) for dynamic software tuning", *Seventeenth Annual International Computer Software and Applications Conference, 1993. COMPSAC 93. Proceedings*, (1993), 248-256.

\* cited by examiner

*Primary Examiner* — Tuan Anh Vu
(74) *Attorney, Agent, or Firm* — Schwegman, Lundberg & Woessner, P.A.

(57) ABSTRACT

Method and computer system for software tuning. A computer system stores variables (210) for storing at least one threshold value for at least one parameter (P1) influencing the performance of a software application (200) with regards to a specific task. A threshold evaluator (220) compares (430) the at least one threshold value to at least one corresponding current value allowing the software application (200) to select (440) an algorithm (A1) from a plurality of algorithms (A1 to AN) for performing the task in accordance with the result of comparison.

19 Claims, 20 Drawing Sheets

METHOD AND COMPUTER SYSTEM FOR SOFTWARE TUNING

CLAIM OF PRIORITY

This application is a U.S. National Stage Filing under 35 U.S.C. 371 from International Patent Application No. PCT/EP2004/051381, filed on Jul. 7, 2004, and published as WO 2005/005214 A1 on Jan. 20, 2005, which claims priority under 35 U.S.C. §119(a)-(d) or 365(b) from European Patent Office Patent Application No. EP20030153662, Publication No. 1 496 450 A1, filed Jul. 8, 2003, the entire content of each of the applications is incorporated herein by reference.

FIELD OF THE INVENTION

The present invention generally relates to electronic data processing, and more particularly, relates to methods, computer program products and systems for software tuning.

BACKGROUND OF THE INVENTION

Some software products (e.g., application systems, database systems, etc.) include parameter profiles that can be set by specialists to achieve an optimal performance of the software product in a given environment of a computer system. The environment is determined, for example, by the used hardware, operating system, network data transfer speed, and many other factors. There are cases where the specialist has to use a try and error procedure to determine the parameters where the software product performs best in the given environment. Typically, the parameters are part of a static configuration of the software product that is defined once.

In the publication "Statistical Models for Automatic Performance Tuning" by Richard Vuduc et al., automatic tuning systems are proposed that are based on search-based systems. The paper discloses a heuristic for stopping an exhaustive compile-time search early if a near-optimal implementation is found. Further, it shows how to construct run-time decision rules, based on run-time inputs, for selecting from among a subset of the best implementations. Complex statistical techniques are used to exploit a large amount of performance data collected during a search. The run-time decision rules can be costly so that the compile-time search may be preferable.

SUMMARY OF THE INVENTION

One embodiment of the invention provides a simple mechanism for enabling a computer program that runs on a computer system to tune itself without human interaction for achieving optimal system performance in a given environment at runtime. An advantage of this embodiment is that simple comparisons with threshold values are used for the selection of the most suitable algorithm for a specific task instead of complex statistical techniques. A further advantage lies in the ability to handle more-dimensional dependencies of the performance of alternative algorithms for performing the task.

Another embodiment provides a mechanism to enable the computer program to dynamically adjust tuning parameters at runtime when the environment changes. This embodiment allows the software application to recalculate threshold values of multiple dimensions based on the actual performance of the alternative algorithms. If appropriate, the software application can use the recalculated threshold values for future algorithm selection.

In another embodiment of the invention a data storage system automatically switches between multiple data retrieval algorithms. This embodiment provides a fast data retrieval mechanism in the presence of more than one parameter influencing the performance of the data retrieval.

The aspects of the invention will be realized and attained by means of the elements and combinations particularly pointed out in the appended claims. Also, the described combination of the features of the invention is not be understood as a limitation, and all the features can be combined in other constellations without departing from the spirit of the invention. It is to be understood that both the foregoing general description and the following detailed description are exemplary and explanatory only and are not restrictive of the invention as described.

DETAILED DESCRIPTION OF THE INVENTION

Figure 1:
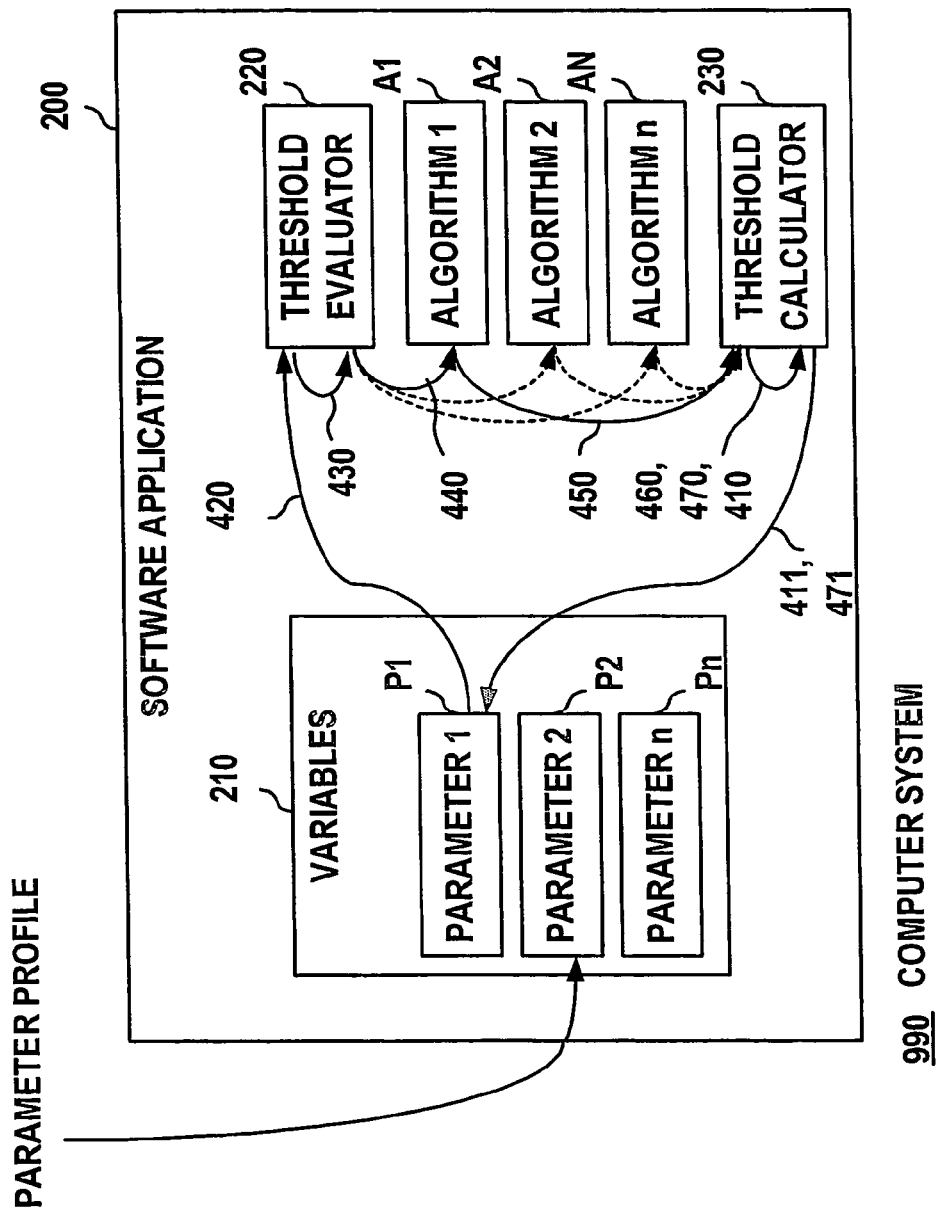
FIG. 1 is a simplified block diagram of a computer system that can be used with an embodiment of the invention.

FIG. 1 shows a software application 200 as part of a computer system 990 that can be used with an embodiment of the invention. The software application 200 uses parameter variables 210 that can be set to specific threshold values for a corresponding parameter. The threshold values can come from a parameter profile (e.g., for the second parameter PARAMETER 2) or they can be calculated by the software application 210 (e.g., for the first parameter PARAMETER 1). For example, the software application can be a technical software application, such as a data storage system management application or it can be a business software application, such as an enterprise resource planning application, or a customer relationship management application, or any other software application.

The parameter variables 210 store information about the parameters that can be used to influence the performance of the software application 200 with regards to a specific task. The parameter variables P1 to Pn will also be referred to as variables. The software application implements various algorithms A1 to AN for performing the specific task in different ways. Further algorithms used for different tasks may be implemented in the software application. For example, specific tasks can be sorting data, retrieving data, filtering data or any other operation performed on data that may depend on a parameter that has influence on the performance of the specific task. For example, threshold values that can influence the performance can be either hardware related parameters (e.g., the number of processors in the computer system, the available main memory of the computer system) or software related parameters (e.g., the main memory allocated to the software application, the size of the data volume, the number of hits of a query, or any other parameter value, that can influence the performance of the software application). Software related parameters can easily be modified by the software application itself, whereas hardware related parameter modification in general requires human interaction (e.g., adding an additional blade in a blade server) in many cases.

The software application further implements a threshold evaluator 220 and a threshold calculator 230.

In a first step the threshold calculator 230 is used to calculate 410 one or more threshold values of the first parameter that relates to the specific task. Details are explained under FIG. 2. The calculated one or more threshold values are stored 411 in corresponding variables (e.g., variable P1). In one alternative, multiple threshold values of the parameter are stored in one variable (vector variable). In another alternative, for each threshold value a corresponding variable is used.

The software application generates current values with respect to the parameters. For example, for performing a sort function for data in a list, the current value can correspond to the length of the list. A threshold value in the first variable P1 indicates that for a current value below the threshold value the best system performance is achieved when using a first algorithm (e.g., A1) and for a current value above the threshold value the best system performance is achieved when using a second algorithm (e.g., A2). In other words, each algorithm covers a corresponding value range where the use of the algorithm provides the best system performance. That is, the one or more threshold values separate the value range of the first parameter P1 into at least two intervals.

The threshold evaluator 220 uses 420 the one or more threshold values P1 when comparing 430 the current value with the one or more threshold values to determine the appropriate algorithm for performing the specific task with optimal performance. In the example, the first algorithm A1 is selected 440 from the plurality of algorithms A1, A2, AN for performing the specific task. The selection is in accordance with the result of the comparing step 430. For example, the first algorithm A1 is assigned to the interval that includes the current value. A1 is determined but any other algorithm A2 to AN might be selected (dashed arrows). This depends on the interval where the current value belongs to.

Once the specific task has been performed, the actual performance of the selected first algorithm A1 can be measured 450 and a check is performed 460 whether the measured performance complies with the one or more threshold values, that is, whether the assignment of the selected algorithm to the interval including the current value delivers the best performance within the plurality of algorithms.

The threshold calculator 230 uses the performance measure and, in case the performance measure does not comply with the current setting of the one or more threshold values for the first parameter P1, recalculates 470 the one or more threshold values for the first parameter P1. The one or more recalculated threshold values are then used to update 471 the corresponding variables 210.

Figure 2:
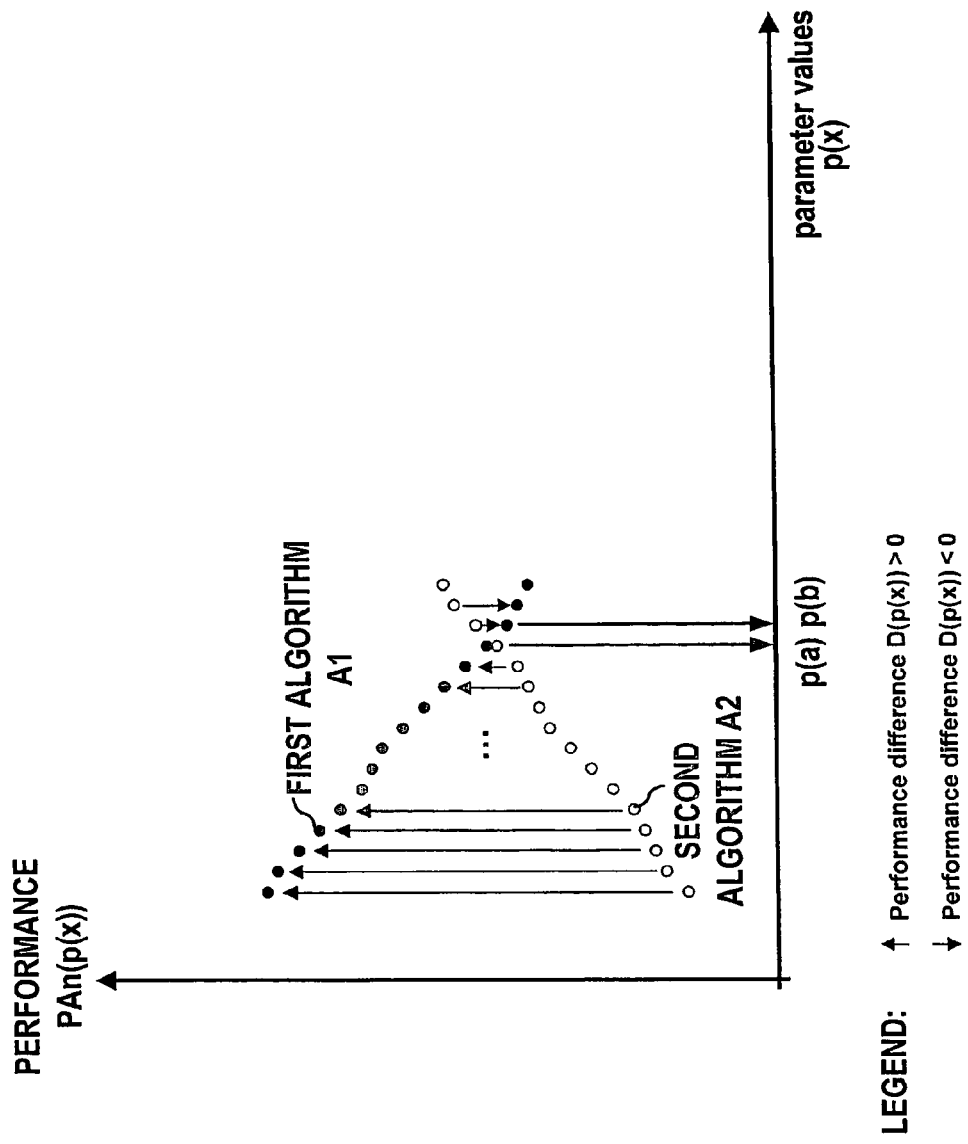
FIG. 2 illustrates initialising threshold values.

FIG. 2 illustrates initialising threshold values. Regarding the initial definition of threshold values, one alternative is to provide a profile parameter for each threshold value in a profile file for the software application 200. Profile files are commonly used, for example, for defining buffer sizes, time out parameters, hardware configuration parameters, or parameters for determining software behaviour in specific situations, such as error handling. For example, some parameters may influence the performance of a software application. Usually, the setting of profile parameters requires a specialist who is familiar with the architecture of the software and has a good feeling for the way the software is influenced by the parameter settings. Furthermore, the specialist has to know the value ranges of each parameter. In practice, it turns out that the more profile parameters are available, the less likely it is that the specialist will succeed in tuning the software for optimal performance.

For this reason, an embodiment of the invention can be used to reduce the number of profile parameters that have to be manually set to a necessary minimum. Specialists working from outside the software may tune only parameters that depend on a specific use case or business scenario, where pre-tuning of the software is difficult. For example, consider the pre-tuning of relational database management systems, and in particular deciding in advance which indexes to create, which depends on the final structure of the various tables in the database system.

In this embodiment of the invention, the software itself can tune scenario-independent parameters, such as the threshold values for the various algorithms A1 to An. The initial values may be set during start-up of the software by running predefined test cases for the various algorithms.

The example of FIG. 2 illustrates the automatic determination (initial calculation 410, cf. FIG. 1) of a threshold value with regards to two algorithms A1 (illustrated by bullet points) and A2 (illustrated by circles). In the example, a parameter p is tuned to a series of discrete values between a pair of chosen extreme values. The spacing of values between the extremes need not be very fine and can be equidistant. For each value $p(x)$, a measurement is made of the performance difference $D(p(x))$ (defined as runtime difference or any other suitable measure) between the two algorithms. For example, the difference may be defined as $D(p(x))=PA1(p(x))-PA2(p(x))$. For each difference $D(p(x))$, either a single measurement is made or the average of several runs can be taken.

Below the threshold value, the performance of algorithm A1 decreases steadily with increasing value $p(x)$ whereas the performance of algorithm A2 increases. So the magnitude of the performance difference $D(p(x))$ between the algorithms decreases but always has the same sign. For example, if $D(p(x))=PA1(p(x))-PA2(p(x))$, then the difference is positive as long as algorithm A1 has a better performance than algorithm A2.

The measured performance difference $D(p(a))$ for value $p(a)$ is the last positive difference, so $p(a)$ is the greatest value of p such that D(p)>0. From value p(b) onward, the difference is negative, so p(b) is the least value of p such that D(p)<0. The threshold value lies in the interval between values p(a) and p(b).

An iteration, for example based on an interval bisection procedure, can be used to locate the threshold value within the interval [p(a), p(b)].

For the first step of the iteration, the value p(a) is the left interval border, p(b) is the right interval border and p(c)=[p(b)−p(a)]/2 is the middle of the interval. A new measurement D(p(c)) of the performance difference between the two algorithms is made for value p(c).

If the difference is positive, D(p(c))>0, then the threshold value lies in the right half-interval [p(c), p(b)].

If the difference is negative, D(p(c))<0, then the threshold value lies in the left half-interval [p(a), p(c)].

If the difference is zero, D(p(c))=0, then the threshold value is determined exactly by the parameter value p(c) and the iteration is complete.

If the difference is greater than a predefined delta, the iteration continues. The half-interval containing the threshold value is subdivided into two smaller half-intervals (which are either [p(c), p(d)] and [p(d), p(b)] or [p(a), p(d)] and [p(d), p(c)], depending on whether D(p(c)) is positive or negative) and the performance difference D(p(d)) is evaluated for the value p(d), and so on, as above.

The procedure stops as soon as the threshold value has been identified with sufficient precision. This may depend on:

The size of the measured difference D(p), for example, whether D(p)<delta, for some predefined minimal difference delta.

The type of the parameter, for example, whether p(x) is of type integer or floating point.

In this way, this embodiment of the invention can calculate initial values for all threshold values during start-up.

This start-up calculation can last for several milliseconds or even seconds before the software is up and running.

However, the software tunes itself automatically and optimally on the given environment (e.g., given hardware, operating system). It can be expected to do so more quickly, more exactly, and more inexpensively than a specialist could tune the software by manually setting profile parameters.

Figure 3:
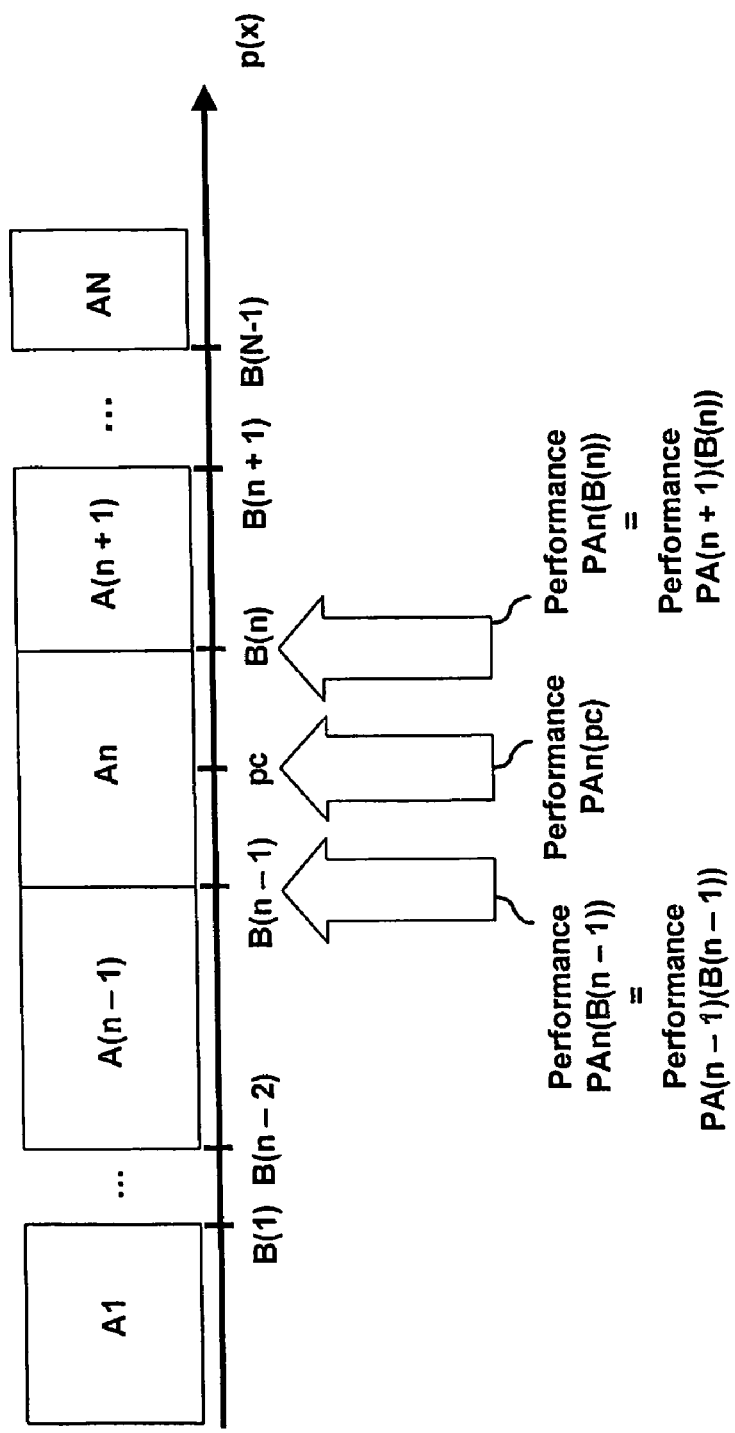
FIG. 3 illustrates dynamically adjusting threshold values in one dimension.

FIG. 3 illustrates updating threshold values dynamically during operation of the software application 200 (cf. FIG. 1). There can be the plurality of algorithms A1 to AN for performing the same task, where each algorithm is used for a corresponding interval. That is, each algorithm has at least one threshold value that represents a boundary of the corresponding interval.

Assuming that the initial threshold values are correct at start-up and for some time after start-up, in the course of time, this situation may change, for example, because of memory fragmentation or accumulating memory leaks due to bugs in the coding or other reasons. Therefore, after a certain time the software can run under conditions that differ from those that prevailed immediately after start-up.

The performance of any of the algorithms A1 to AN may degrade or improve by different amounts relative to the other algorithms. Therefore, the corresponding threshold values may shift in the course of time.

This embodiment of the invention can automatically and regularly repeat its determination of its threshold values, as specified in the above calculation (cf. FIG. 2), so as to adjust the threshold values used to switch algorithms dynamically during runtime.

To revise its determination of threshold values, the software application 200 makes automatic performance measurements 450 (cf. FIG. 1), for example, by using an appropriate time measuring component. For example, the measurements can simply be records of the time taken for certain tasks to run. The measurements can be made either on an ongoing basis or from time to time.

When using ongoing performance measurements, the software application 200 measures the performance of each execution of an algorithm.

If the current execution of algorithm A1 corresponds to a current value p(x) that is below the threshold value B1, the performance PA1(p(x)) of algorithm A1 should in general be better than its performance at the corresponding threshold value B1, since this is the reason why the software 200 executes algorithm A1 instead of algorithm A2 (see FIG. 2).

At the threshold value B1, the performance of algorithm A1 is by definition the same as that of algorithm A2, that is, PA1(B1)=PA2(B1).

In FIG. 3, for the algorithm An (1<n<N) chosen in the interval between the two neighbouring threshold values B(n−1) and Bn, the performance PAn(pc) of the algorithm An at the value pc (in the interval) should be either the same as or better than its performance PAn(B(n−1)) and PAn(Bn) at the upper and lower threshold values B(n) and B(n−1).

If the performance PAn(pc) of algorithm An (middle arrow) is below its performance PAn(B(n−1)) (left arrow) or PAn(Bn) (right arrow) at a neighbouring threshold value (either B(n−1) or Bn, respectively), then it is no longer advantageous to choose the algorithm An at the value pc. As a consequence, the checking step 460 (cf. FIG. 1) concludes that the measured performance for the algorithm does not comply with the current setting of threshold values.

Therefore, in future, at parameter value pc, the software application chooses an algorithm that was earlier measured as performing better in the neighbouring interval, which is either algorithm A(n−1) or A(n+1). This choice is equivalent to moving the threshold value B(n−1) or Bn, respectively, to a new position at value pc, which corresponds to the recalculating step 470 (cf. FIG. 1).

However, when algorithm A(n−1) or A(n+1) is next run at parameter value pc, it may be the case that the newly measured performance of the algorithm is also reduced, possibly even more so than the performance of the original algorithm An. In this case, the threshold value B(n−1) or Bn, respectively, should not have been moved to the new position pc.

This situation may occur in practice because any reasons for the reduced performance of algorithm An may also apply to reduce the performance of algorithm A(n−1) or A(n+1).

Therefore, a situation like this can trigger a recalculation of all the threshold values, either immediately or as soon as practically possible, for example, when the system load is sufficiently low. Alternatively, the software can generate a system message to warn an administrator that the latest performance measurements indicate the need for a recalculation of the threshold values.

When using performance measurements from time to time, the software recalculates 470 the threshold values preferably at times of low system load, in the same way that it does during start-up for the initial calculation 410 (cf. FIG. 1). This recalculation may be defined as part of a bundle of housekeeping tasks that are performed at regular time intervals by the software. In this case, the threshold values are adjusted with a lower frequency than when using the ongoing basis alternative.

Removing as many manually set profile parameters as possible from a profile file and letting the software itself tune such parameters instead of a specialist can lead to an improved performance over the full range of parameter values.

However, in certain exceptional and rare situations, there may be good reasons why such parameters should not be tuned by the software but from outside by a specialist.

These exceptional cases can be handled as follows. By default, profile parameters that are tuned by the software itself do not appear in the profile file. However, if an expert explicitly sets a parameter threshold value by entering it in the profile file, then the software does not change the threshold value of this parameter.

Figure 4:
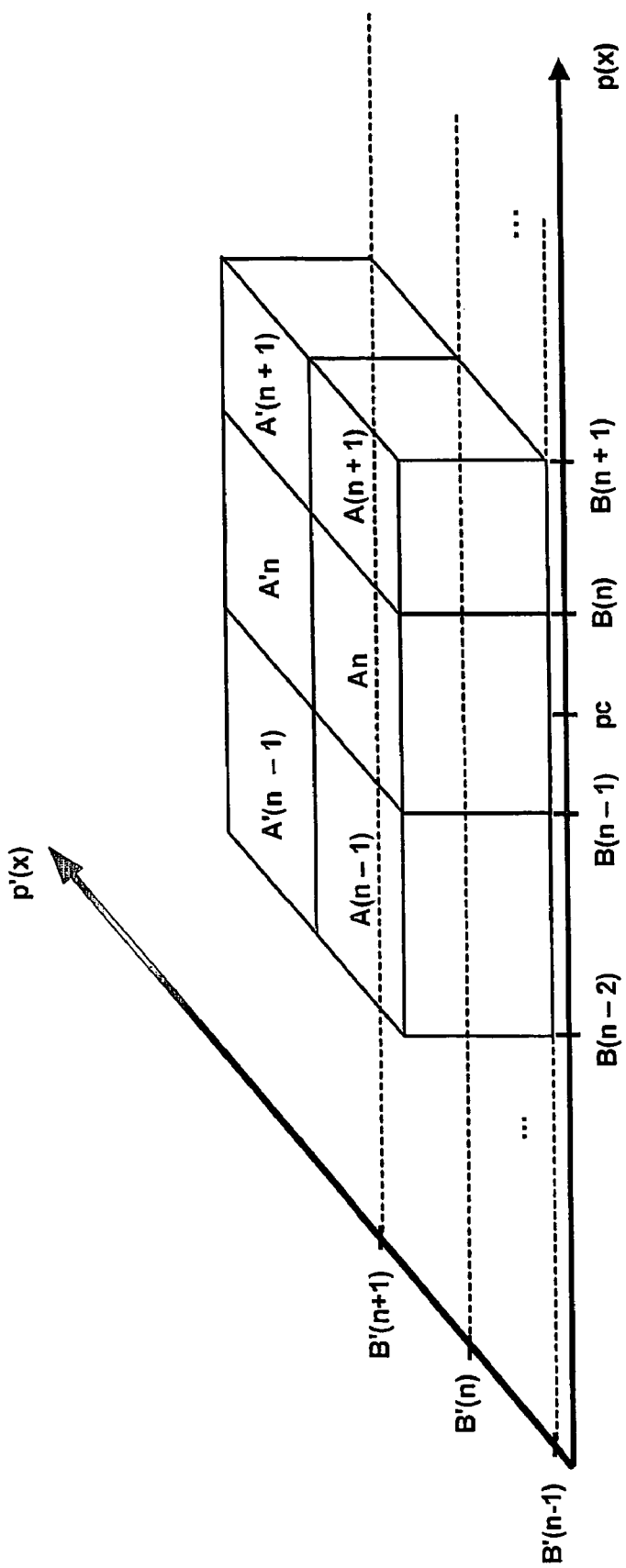
FIG. 4 illustrates threshold values and corresponding algorithms in two dimensions.

FIG. 4 illustrates threshold values and corresponding algorithms in two dimensions. The first dimension is defined by the first parameter p as described in FIG. 3. The second dimension is defined by a second parameter p'. For the second parameter p', for example, three threshold values B'(n−1), B'(n), and B'(n+1) can be stored in the corresponding variables. There can be any number of further parameters defining further dimensions.

In the example, for each value of the first parameter p, two algorithms are available. In general, any number of algorithms can be available for each value of one dimension. For example, for the value pc the algorithms An and A'n can be used in the first dimension interval [B(n−1),B(n)] to achieve optimal performance regarding the first parameter p. Each algorithm is represented by a corresponding rectangle in the drawing to reflect the coverage of the two dimensions. However, which of the two algorithms provides the best performance depends also on the second dimension. If the value of p' is in the second dimension interval [B'(n−1), B'(n)], then the algorithm An is selected by the software application. If the value of p' is in the second dimension interval [B'(n), B'(n+1)], then the algorithm A'n is selected. That is, in the case of multidimensional performance dependencies the threshold evaluator compares a plurality of current values of various dimensions to a plurality of corresponding threshold values and selects the appropriate algorithm for the specific task that provides the best performance for the current combination of current values in the various dimensions.

The threshold calculator can initialise the threshold values of various dimensions by using the initialising procedure described under FIG. 2 for one dimension while values of the further dimensions are kept constant during the performance measurement.

In the following, an example for the software application 200 is a database management software of a data (storage) system that can be used together with an embodiment of the invention. The data system may be implemented according to a relational database model. However, the system is not limited to use within the constraints of a known relational database architecture. The elements of the data system roughly translate to the known nomenclature of the relational database theory as follows (with the definitions used with an embodiment of the invention on the left):

| InfoSystem | ← | Management System |
| InfoArea | ← | Database |
| InfoCluster | ← | Table |
| InfoType | ← | Attribute |
| InfoCourse | ← | Data record |
| InfoCell | ← | Field |

Further definitions of terms, as used hereinafter:
Boolean Operators:
operators used in Boolean statements, e.g., AND, OR.

Relational Operators:
operators used in relational statements, e.g.,

| < | (less than) |
| <= | (less than or equal to) |
| > | (greater than) |
| >= | (greater than or equal to) |
| = | (equal to) |
| <> | (not equal to) |

Condition:
relational statement comparing data, such as numerical data or alphanumeric data, using one or more relational operators.
Boolean Expression:
statement including multiple conditions that are combined using Boolean operators.

Figure 5:
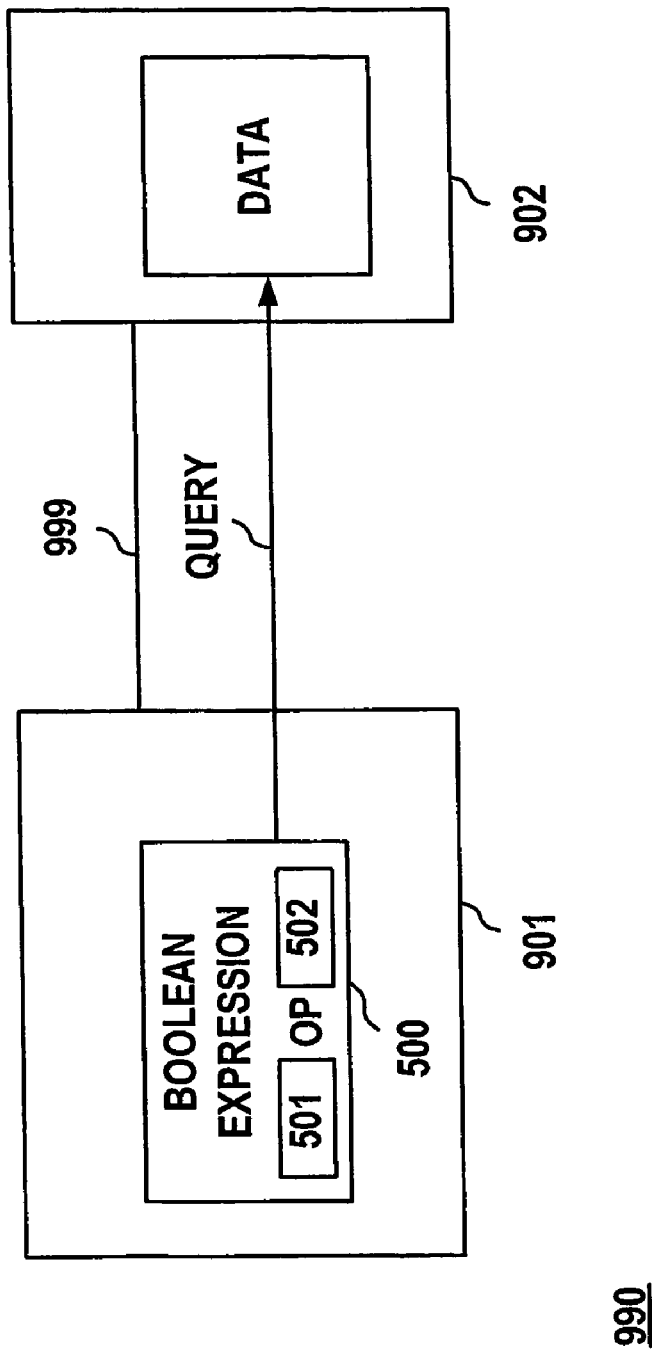
FIG. 5 is a simplified block diagram of an example of a data storage computer system that can be operated according to invention.

FIG. 5 is a simplified block diagram of the computer system 990 that can be used with an embodiment of the invention. The computer system 990 includes multiple computing devices (e.g., first computing device 901 and second computing device 902) that communicate over a network 999, such as a local area network (LAN), wide area network (WAN), the Internet, or a wireless network.

For example, the second computing device 902 may be a backend system, such as a database system, a file system or an application system, that stores data. The data can also be stored anywhere inside or outside of the computer system 990.

The first computing device 901 may be used to compose Boolean expressions 500 to be used in a QUERY for retrieving selected data from the second computing device 902. For example, the first computing device 901 may be a front end computer that provides a graphical user interface (GUI) to a user.

There can be various ways in which the data storage system 902 receives the QUERY, dependent on the interfaces offered for the data storage system 902. For example, in case of using an SAP R/3 based system, the SAP Remote Function Call (RFC) functionality provided by the ABAP kernel can be used. An application programming interface (API) can be implemented as a collection of ABAP Function Modules. The API uses the RFC functionality to communicate remotely with the data storage system. An SAP R/3 based application uses the API for receiving parameters that are passed to the data storage system 902. The corresponding results are then returned as ABAP parameters. A selection query is filled into an internal table in ABAP and can be rapidly processed by the data storage system since the query is already pre-structured.

In general, any interface or meta format can be used to post a Query to the data storage system. A pre-structured query is useful but not necessary. The query may also be coded in XML or simply be passed to the data storage system as a string that has to be parsed within the data storage system.

FIGS. 5 to 11 explain details of one embodiment of the data storage system 902. For example, as described in the patent application PCT/EP02/01026, the data storage system 902 can be configured as a fast cache with all data structures residing in its main memory. The Boolean expression 500 can include at least a first portion 501 and a second portion 502, each portion representing a selection condition of any degree of complexity applicable to the data structures in the main memory. Further portions may be included. The portions are combined through logical or relational operators (OP).

Figure 6:
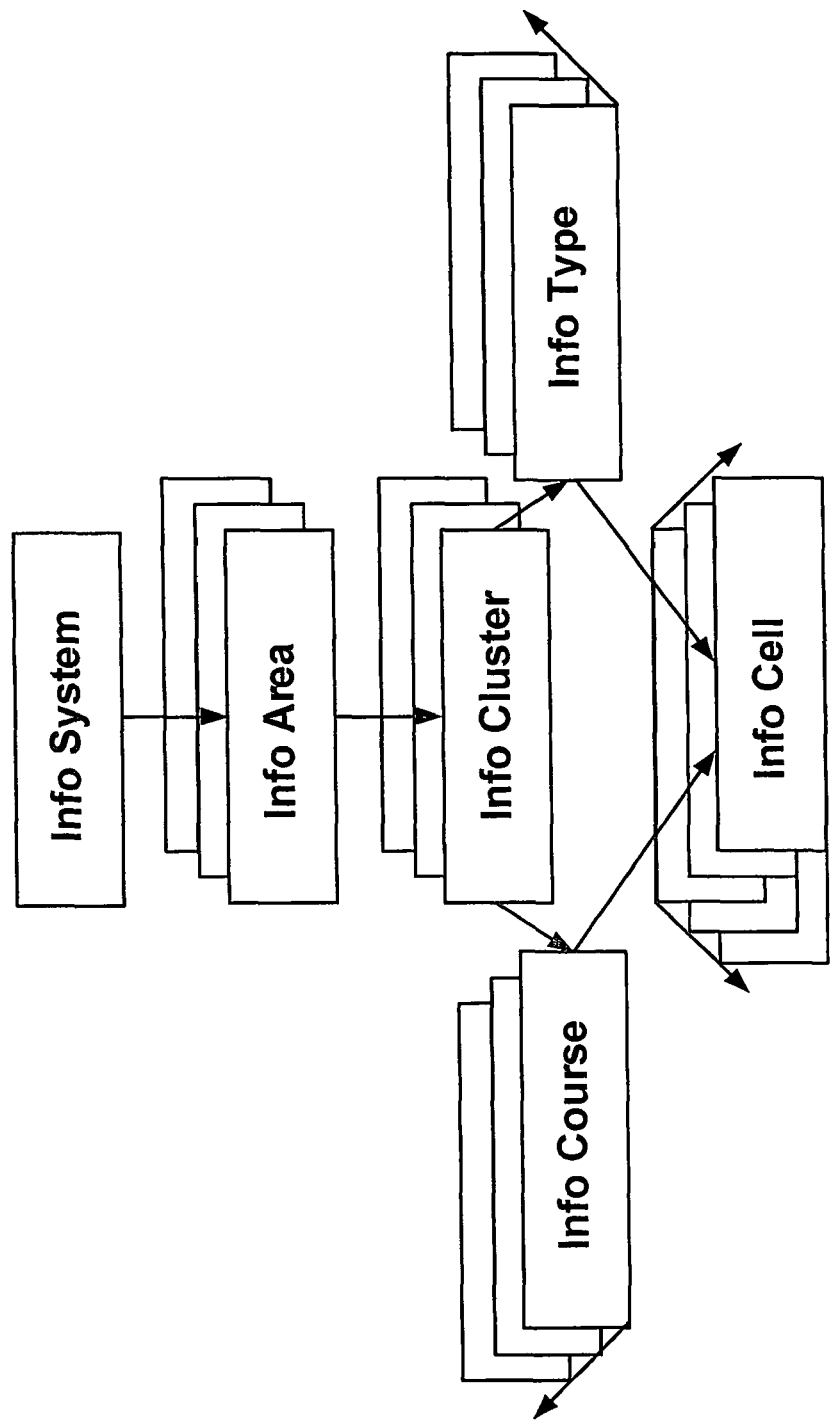
FIG. 6 is a diagram of a static hierarchical data structure used in one embodiment of the data storage system.

FIG. 6 is a diagram of a static hierarchy structure used in one embodiment of the data storage system 902. Each box in the structure corresponds to an instance of the data type that is used as a label for the box. Multiple overlapping boxes illustrate multiple instances of the same data type. A single arrow between instances of different data types stands for an arbitrary number of arrows between multiple instances at each corresponding level of the structure. In the following, the data type labels are used to refer to corresponding instances of the data type. The highest level in the structure is the InfoSystem level. Down from the top level one or more InfoAreas are connected to the InfoSystem. The InfoSystem provides algorithms necessary to operate the data storage system in run time. The InfoSystem is connected to any number of InfoAreas through a linking element, which will be described hereinafter as an anchor. These InfoAreas can for example refer to logical units of the InfoSystem.

Each InfoArea is connected via a linking element (again an anchor as described hereinafter) to an InfoCluster. In turn, each InfoCluster is connected to at least one InfoCourse and at least one InfoType, through respective linking elements, such as anchors. The InfoType can be seen as an attribute of a table; an InfoCourse starts always in an InfoCluster. If an InfoCourse stays within an InfoCluster with its addressed InfoCell elements corresponding to fields of a table, then the InfoCourse is similar to a record of a table, such as a relational database table.

Under the InfoCourse and the InfoType the InfoCell is found; this is the element on the lowest level in the hierarchical structure. On the creation of an InfoType an anchor is created that is an InfoCell also. This anchor has the function to represent the structure of following InfoCell elements.

Figure 7:
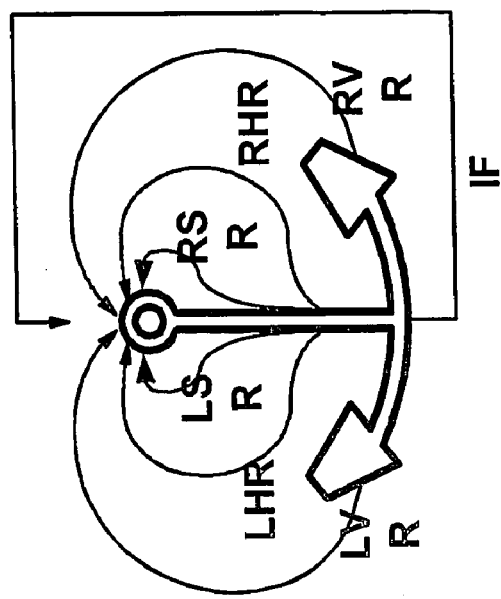
FIG. 7 schematically shows the initial state of an anchor as used in the data structure.

For the implementation of the levels below the InfoArea level, i.e. the InfoCluster, the InfoCourse, the InfoType, and the InfoCell levels, use is made of a data element according to the invention as shown in FIG. 7. In this example, the data element is shown schematically as an anchor, and is provided with a number of pointers. The pointers of the first pair are labelled LVR and RVR (Left Vertical Ring, respectively Right Vertical Ring), the pointers of the second pair are labelled LHR and RHR (Left Horizontal Ring, respectively Right Horizontal Ring), the pointers of the third pair are labelled LSR and RSR (Left Self Ring, respectively Right Self Ring), and the single pointer is labelled IF (InFormation bridge). Note that the pointers LSR, RSR and IF are in principle optional.

Further pointers my be used. In the initial state, as shown in FIG. 7, all pointers point to the anchor. This initial state is also the simplest of possible ring structures. Every pointer in the structure has a valid address, and cases of a non defined pointer (nil pointer) are avoided.

In the following, example data is used as shown in table A of FIG. 12. The table includes data regarding first names, ages and weights. For this table an InfoCluster is generated. Furthermore, three InfoTypes are generated to represent respectively first names, ages, and weights.

Figure 8:
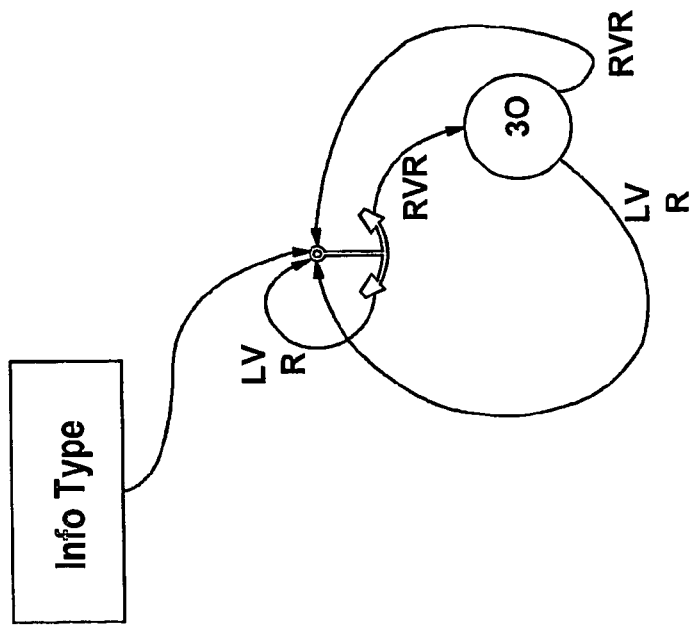
FIG. 8 illustrates the use of the anchor for the implementation of an InfoType.

FIG. 8 illustrates the use of the data element for the implementation of the InfoType. In the InfoType, semantic information is included, such as, the data type (in this example "INTEGER"), field name (in this example "age")), etc. The InfoType has an anchor associated with the InfoType. The anchor points with its RVR pointer to the actual information carrier, that is the InfoCell. The InfoCell is as described above the lowest level entity within the data system. The InfoCell holds the information, as shown in FIG. 8; in this example "age is 30 in INTEGER".

As described above, the InfoCell is provided with a LVR/RVR pointer pair. As shown in FIG. 8, the RVR pointer of the InfoCell points towards the anchor, and also the LVR pointer points to the anchor. As a result, the ring configuration of the anchor is maintained.

Figure 9:
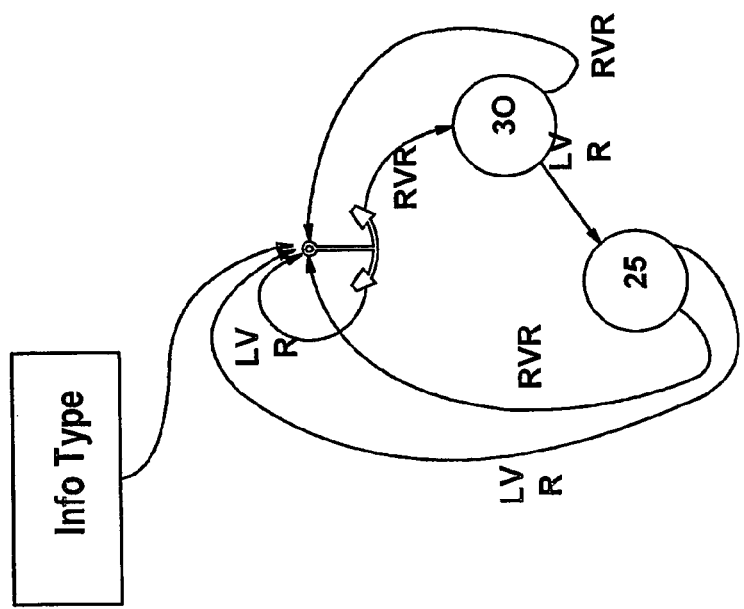
FIG. 9 illustrates adding an InfoCell to the data structure.

FIG. 9 illustrates how a further InfoCell is added to the data structure. The InfoCell (with the value "25") is inserted in the LVR ring after the first InfoCell. The LVR and RVR pointers of the InfoCell point to the anchor, as to maintain a closed ring.

The order in which the InfoCells are organized depends on their value. In case of a smaller value, the InfoCell is ordered in on the LVR side, otherwise on the RVR side. This practise is well known in the art as binary tree building. Preferably, the binary trees are organized as balanced or AVL trees, methods which are well known in the art. These kinds of trees minimise the number of levels within the tree structure, so as to minimize access time. Preferably, all tree structures within the data system are dynamically balanced in use, so as to guarantee optimum access times.

Figure 10:
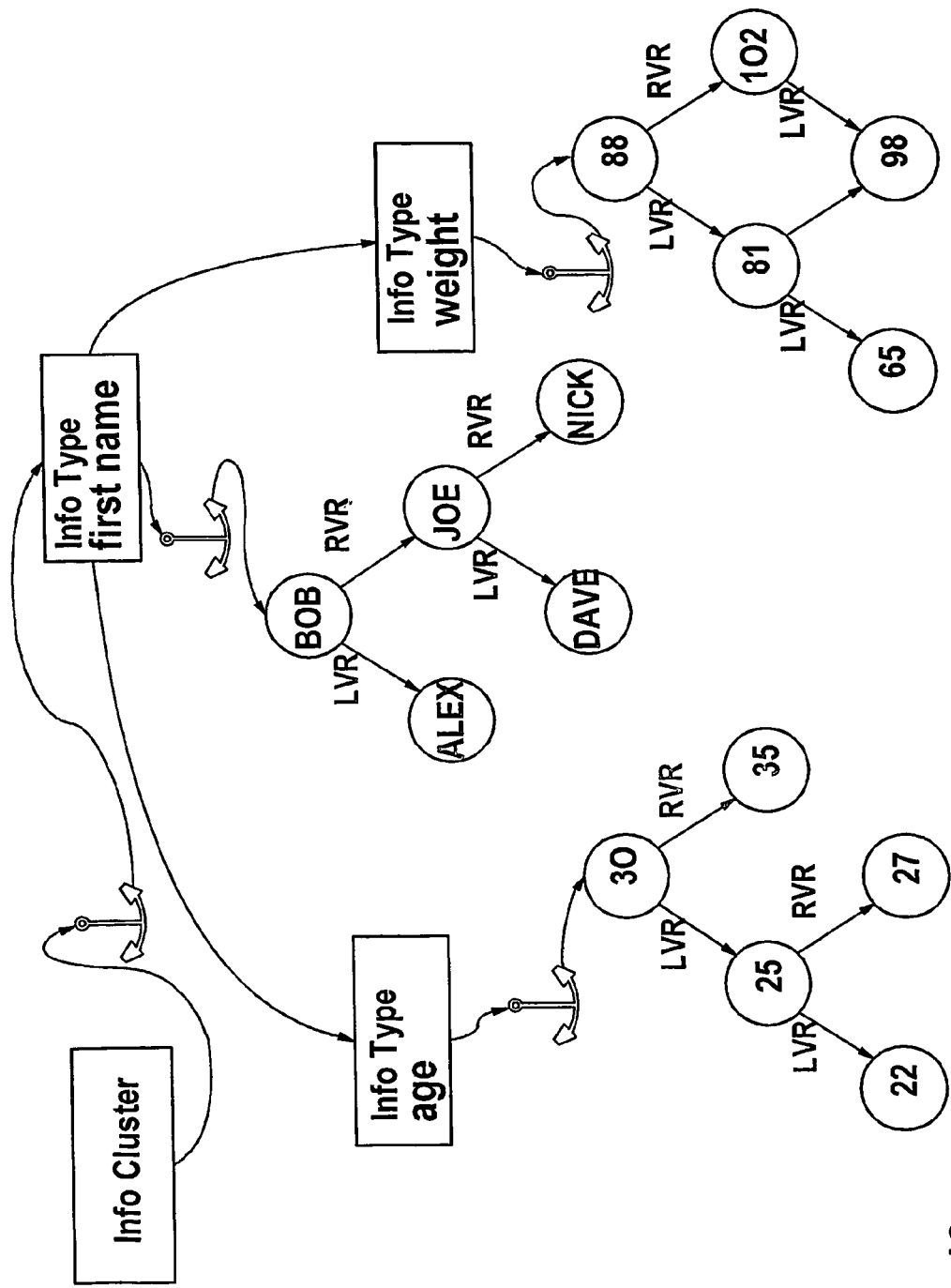
FIG. 10 illustrates the structure that is obtained when multiple InfoTypes are put into the data structure.

FIG. 10 illustrates the structure that is obtained when all InfoTypes of the table A are put into the data structure. In total, three InfoTypes are present; age, first name, and weight. Note that the end pointers of each last element in the respective trees are not shown. Under each anchor of the InfoType, the InfoCells are organised in a binary tree. The InfoCluster points to an anchor which in turn points to a first InfoType. The first InfoType in turn points to the other two InfoTypes. Each InfoType points to an anchor. The anchor has the additional function of a marker, that can be used by an access or query process as a break or return sign.

To complete the implementation of the table, the relations between the InfoType have to be made. To this end an InfoCourse is introduced.

Figure 11:
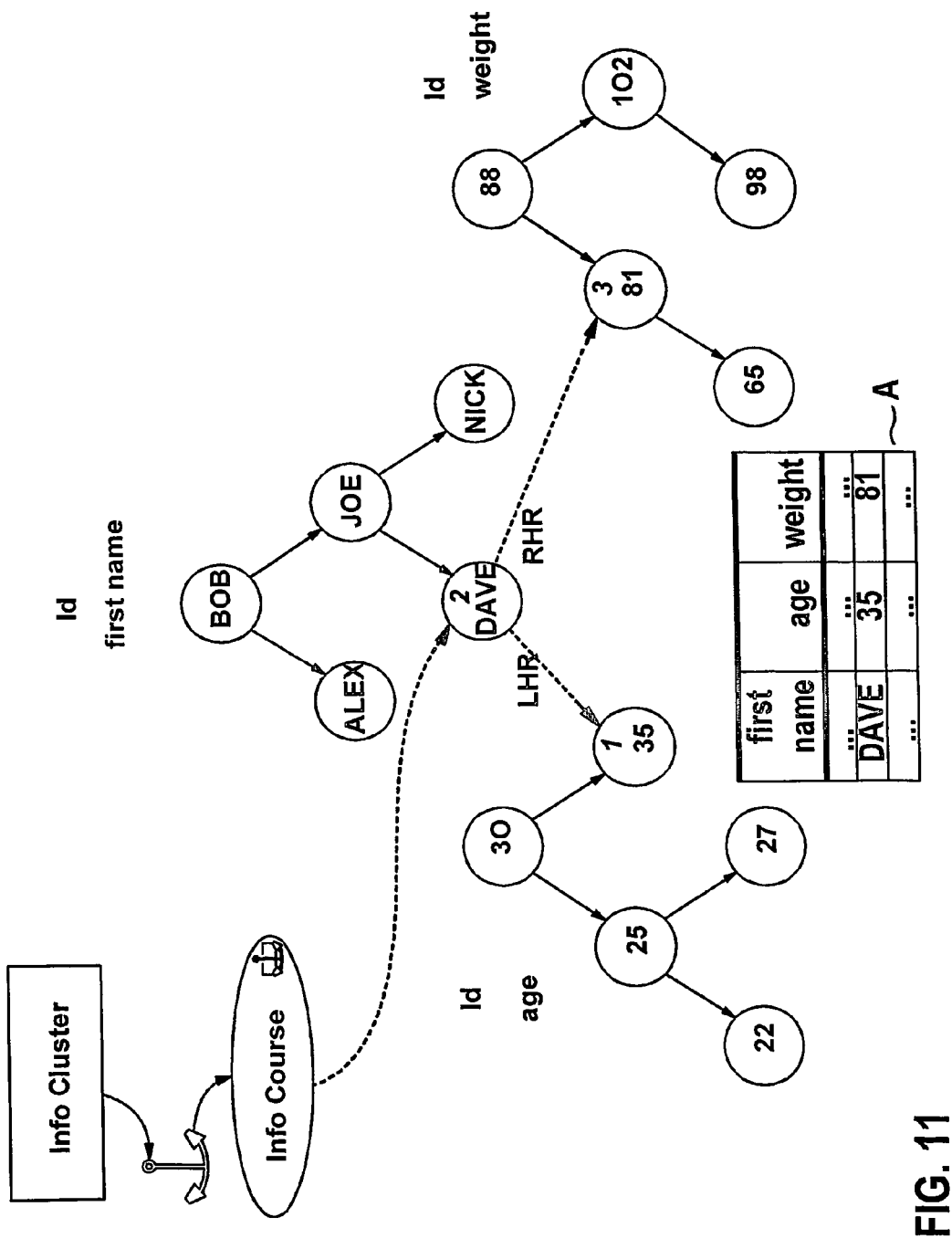
FIG. 11 shows an InfoCourse that contains data.

FIG. 11 shows the InfoCourse that contains the data for a row of the table A. Use is made of the LHR and RHR pointers. The end pointers again point back to the anchor of the InfoCourse to maintain the ring structure. Note that the InfoCourse also forms a binary tree, sorted by the ID numbers of the InfoTypes. Note that the ID numbers of the InfoTypes are unique. For example, integer values are used for the ID numbers.

Figure 12:
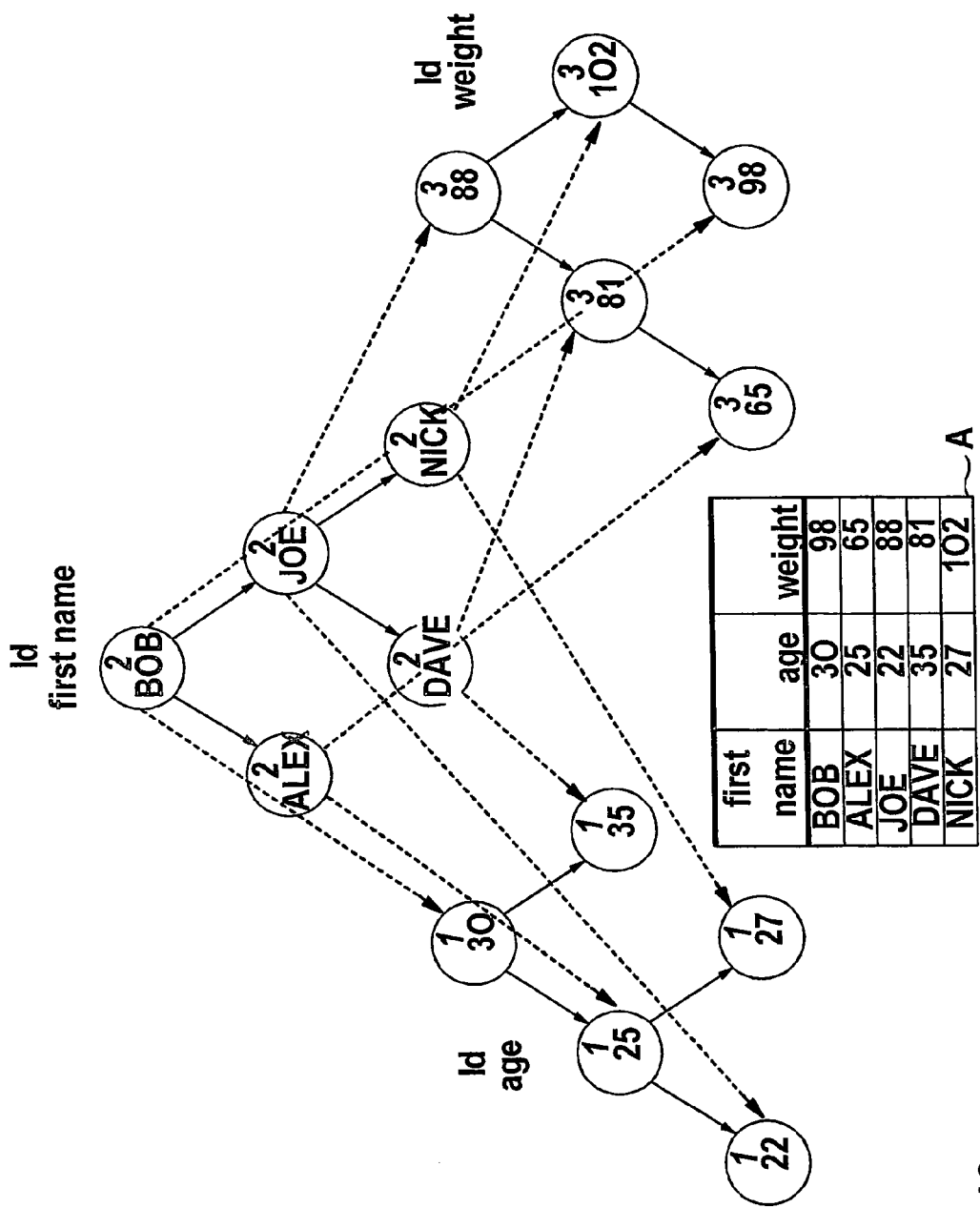
FIG. 12 illustrates multiple InfoCourse paths in the data structure.

FIG. 12 illustrates all the InfoCourse paths (for example implemented using pointers) for the table A. Note that all InfoCells have been provided in the top section with their respective InfoType Id number, over which the binary tree configuration of the InfoCourse via the LHR/RHR pointers is organized. Elements that belong to an InfoType are connected by solid arrows. Elements that belong to an InfoCourse are connected by dashed arrows.

When five million records with 100 attributes (e.g., 100 columns of a relational database table) are loaded into the data storage system 902, then five million InfoCourse trees (InfoCourses) exist, one for each record. Each InfoCourse includes 100 nodes. Each InfoCourse has a corresponding InfoCourse anchor pointing to the respective InfoCourse. In other words, when loading five million records into the data storage system 902 then also five million InfoCourse anchors exist.

Figure 13:
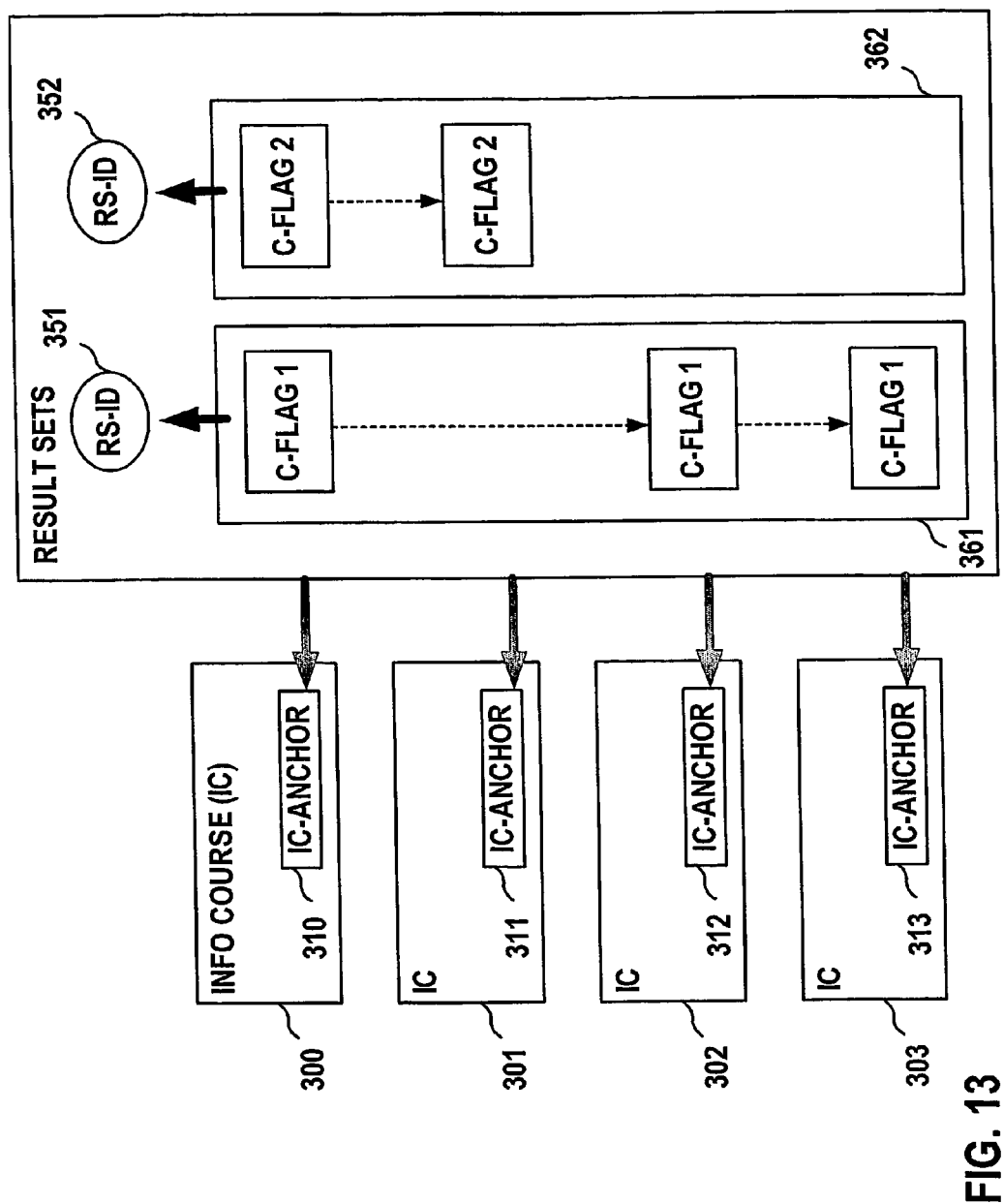
FIG. 13 illustrates how to retrieve data from the data storage system when operated according to the invention.
Figure 14:
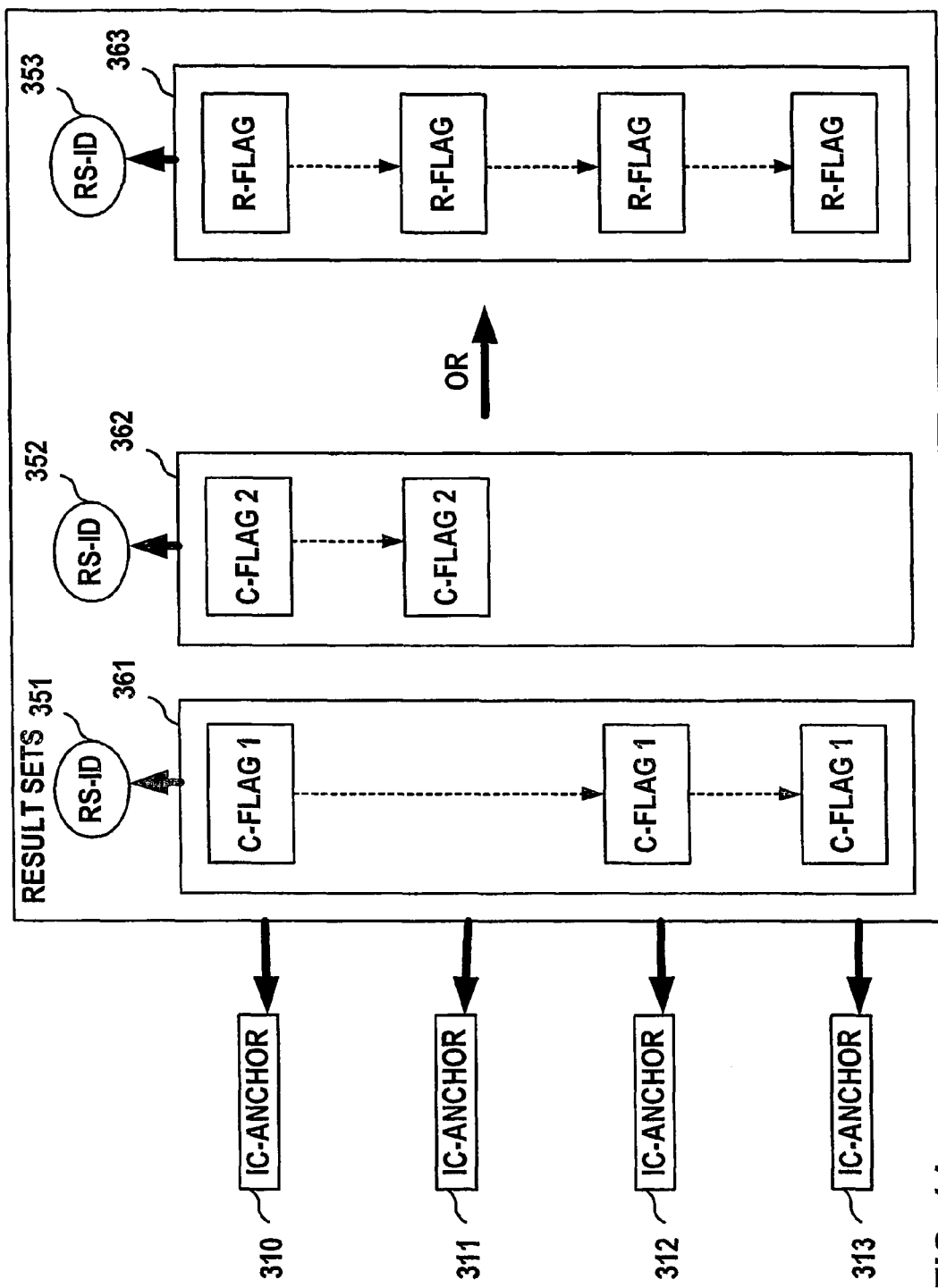
FIG. 14 illustrates how two result sets can be merged into a single result set when applying the Boolean OR operator.
Figure 15:
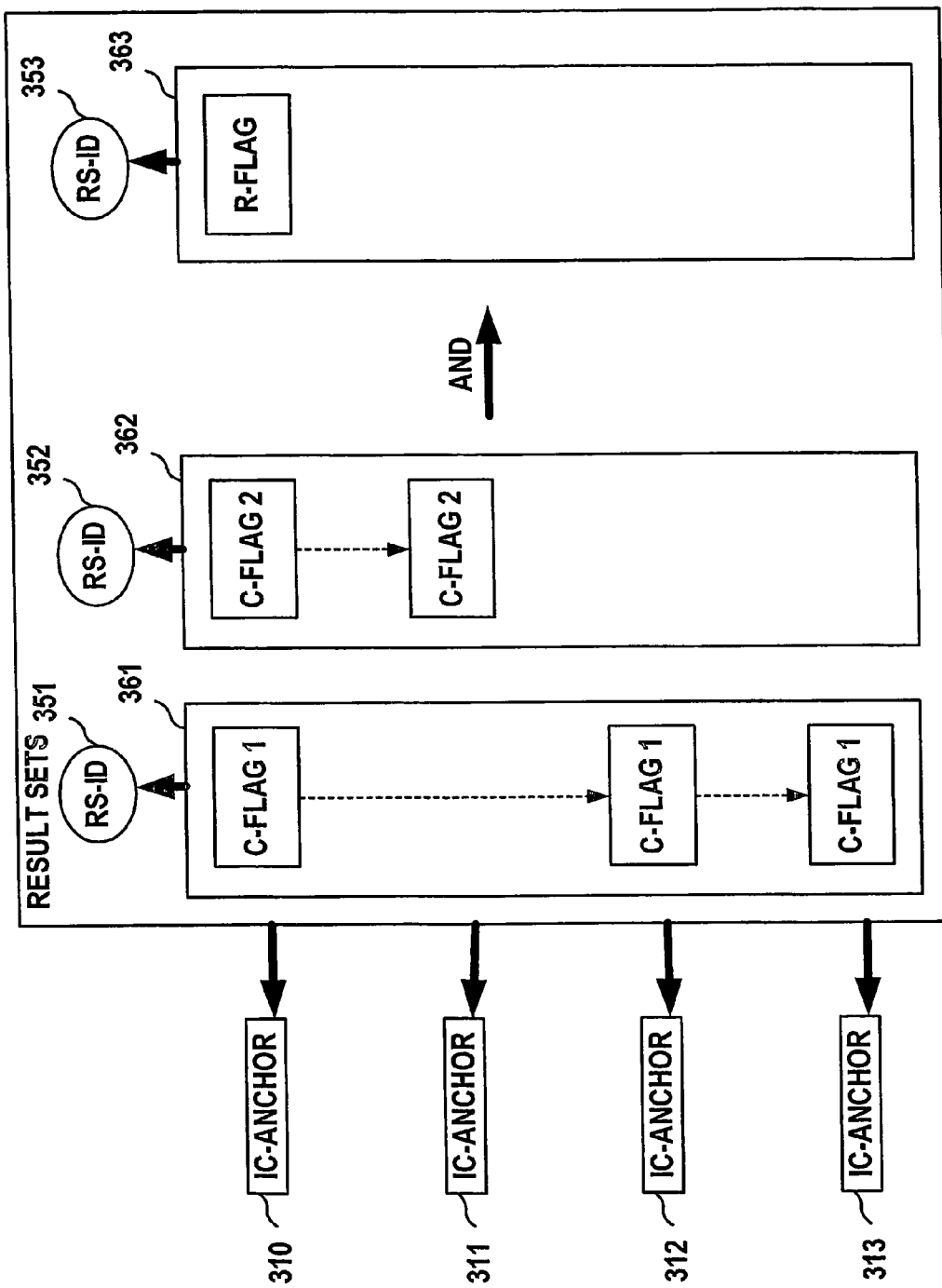
FIG. 15 illustrates how two result sets can be merged into a single result set when applying the Boolean AND operator.
Figure 16:
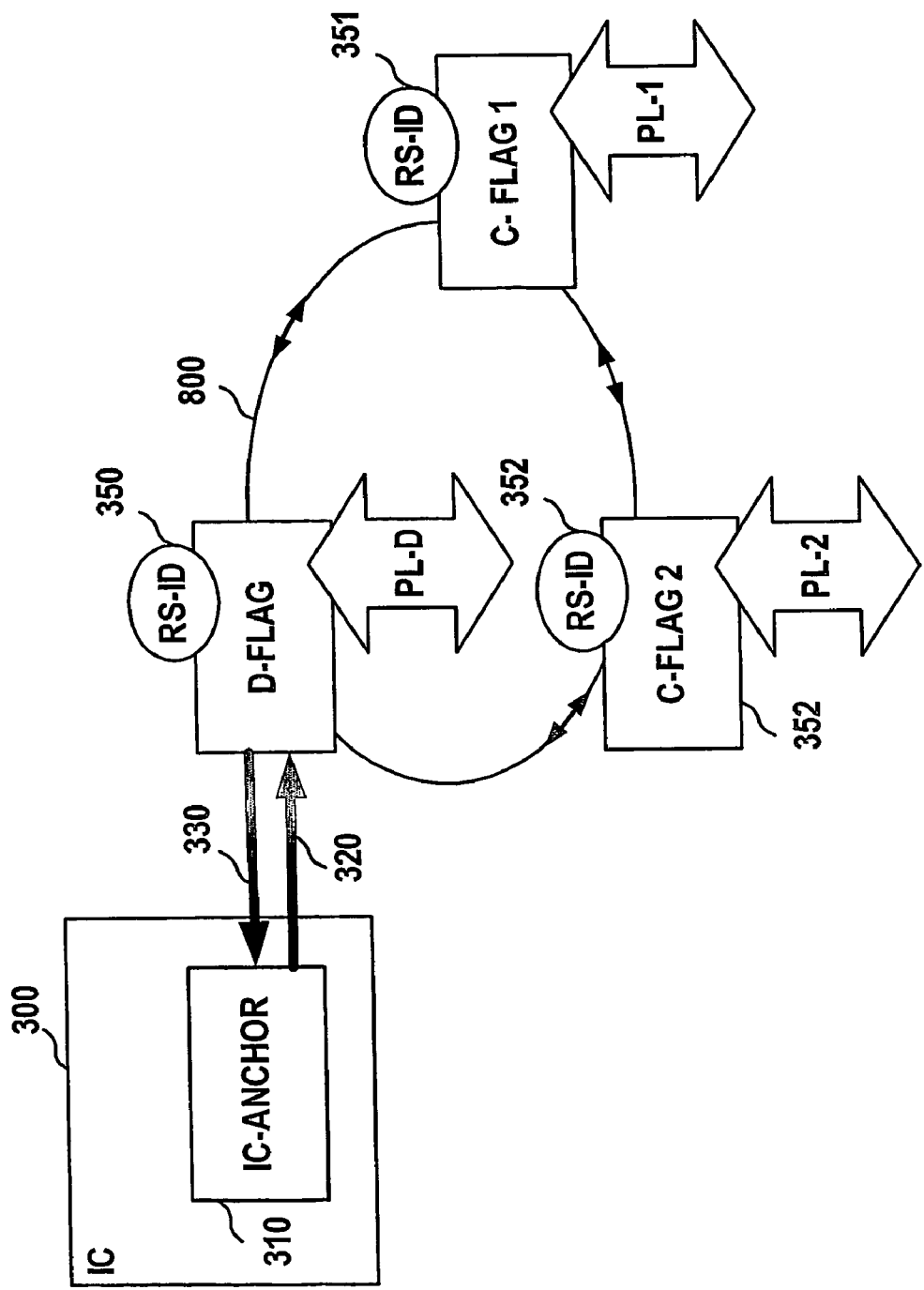
FIG. 16 illustrates a first implementation for the result flags and the result sets.

FIGS. 13 to 15 explain a data retrieval mechanism as an example of a specific task that can be implemented by multiple algorithms. FIG. 16 explains a first implementation of the data retrieval mechanism and FIGS. 17 to 19 explain a second implementation. Each implementation is suitable for a corresponding parameter value range (number of hits).

FIG. 13 illustrates how a computer implemented method can be used to retrieve data from the data storage system 902 when operated according to the invention. It is assumed that the data storage system 902 stores the data using the data structure as described in FIGS. 2 to 8. Note that in this data structure each InfoCourse 300, 301, 302, 303 has an InfoCourse anchor 310, 311, 312, 313.

Once the Boolean expression is received by the data storage system 902, a parser decomposes the Boolean expression 500 into the first portion 501 and the second portion 502. If further portions are included they are also subject to decomposition. Each portion includes at least one condition that has to be fulfilled by any InfoCourse that is selected by the original query. The conditions relate to InfoTypes.

The data storage system 902 then determines a result set for each portion. In the example, a first result set 361 includes result flags (C-FLAG1) in compliance with the first portion 501 and a second result set 362 includes further result flags (C-FLAG2) in compliance with the second portion 502. A result flag is used to indicate whether a specific InfoCourse fulfils a condition in a corresponding portion. Each result flag relates (bold up-arrows) to a result identification number 351, 352 of the corresponding result set 361, 362, where it belongs to. The result flags within a result set are also interrelated (dashed arrows). Further, each result flag relates (bold left-arrows) to the corresponding InfoCourse anchor (IC-anchor) 310, 311, 312, 313 of the InfoCourse fulfilling the corresponding condition.

The two result sets 361, 362 can originate from the evaluation of a complex Boolean expression, where the first result set 361 can be the result of one bracket including potentially any Boolean sub-expression as sub-query. The same is true for the second result set 362, e.g. representing another bracket of the Boolean expression.

FIGS. 13 and 14 illustrate how the first and the second result sets 361, 362 can be merged into a single result set 363 when applying corresponding Boolean operators to the result flags of the corresponding InfoCourse anchors. One implementation of a data retrieval algorithm using pointer lists is explained in more detail in FIG. 16. Another implementation using bitmaps is explained in more detail in FIGS. 17 to 19. In the example of FIG. 14, the Boolean expression 500 combines the first and second result sets with a Boolean OR operator.

For the combination, the InfoCourses or the IC-anchors are not needed anymore. The number of result flags in each result set is known by, for example, incrementing a corresponding counter when creating the result flags.

In one implementation, the data storage system runs through one of the result sets from the first to the last result flag. Advantageously, the result set including the lowest number of result flags is chosen because of a shorter processing time, which becomes more relevant in the case of Boolean AND combinations. The first result set 361 includes three result flags (C-FLAG1) and the second result 362 set includes two result flags (C-FLAG2). Therefore, the data storage system starts with the second result set 362 and then processes the first result set 361. In one implementation, for each IC-anchor where a result flag C-FLAG1 or C-FLAG2 relates to, a corresponding result flag R-FLAG is generated in the third result set 363 with having result identification number 353.

In another implementation, one can use also the first or second result set for storing the result of the Boolean OR operation.

For example, when running through the second result set 362, each C-FLAG2 can be "renamed" into C-FLAG1. The result ID 352 of the second result set is set to the result ID 351 of the first result set.

Further, it is checked whether a corresponding C-FLAG1 result flag exists. If not, the data storage system proceeds with the next C-FLAG2 in the second result set 362. If a corresponding C-FLAG1 exists, then one of these two result flags, either in the first or in the second result set, is deleted to avoid intersections.

To find out, whether a corresponding C-FLAG1 exists in the first result set 361, for example, the data storage system moves along a circular structure that is used to relate the result flags to their corresponding IC-anchor.

After having processed all result flags of the first and second result sets, only C-FLAG1 result flags remain. The combination with OR means to link the two result sets together to one result set. In this example, in the end, all result flags have the result ID 351 of the first result set 361. During the above described procedure the Counters for the number of result flags in each result set are continuously updated (e.g., decremented when result flags are deleted). Therefore, the number of result flags in the "final" result set is the sum of the counters of the first and second result sets just prior to lining them together. This count result can be reported to an application as the number of InfoCourses (records) matching the first portion 501 or the second portion 502 of the Boolean expression 500.

The "final" result set may represent a real final result set or an intermediate result when the Boolean expression 500 includes further portions. In this case, it is combined again with further result sets that correspond to the further portions. A complex query consisting of several nested sub-queries may be evaluated recursively by combining the result sets of sub-queries with the result sets of other sub-queries. This continues until all levels of the Boolean expression are resolved. At the end, a single result set (e.g., result set 363) is left. Its number of result flags corresponds to the number of hits for the whole query (Boolean expression 500).

In the example of FIG. 15, the Boolean expression 500 combines the first and second result sets with a Boolean AND operator.

Again, the data storage system knows the number of result flags in each result set from the corresponding result counters and starts with processing the result set with the lowest number of result flags. This is advantageous in the case of Boolean AND combinations because the total number of result flags can only be as large as the smallest result set. In the example of FIG. 13 the second result set 362 is the smaller one.

For each IC-anchor, where a result flag C-FLAG1 and also a result flag C-FLAG2 relate to, a corresponding result flag R-FLAG is generated in the third result set 363.

In one implementation, one can use also the first or second result set for storing the result of the Boolean AND operation.

For each result flag C-FLAG2 of the second result set 362, the data storage system checks whether a corresponding result flag C-FLAG1 exists in the first result set 361. If so, the result flag C-FLAG2 is the data storage system proceeds with the next result flag of the second result set. If no corresponding result flag C-FLAG1 is found in the first result set, then the result flag C-FLAG2 in the second result set 362 is deleted.

At the end of this filtering procedure, the second result set 362 includes the "final" result set and, therefore, plays the role of the third result set 363. The first result set 361 is not needed any more and can be deleted.

Again, with each deletion of a result flag, the corresponding counter is reduced accordingly. Therefore, the counter of the second result set always contains the current number of result flags C-FLAG2, which, at the end of the filtering procedure, corresponds to the number of hits for the query and may be reported to an Application.

As in the Boolean OR case, the "final" result set may represent a real final result set or an intermediate result when the Boolean expression 500 includes further portions that are subject to further combinations.

FIG. 16 illustrates a first implementation for the result flags C-FLAG1, C-FLAG2 and the result sets.

In this first implementation, the data storage system instantiates an instance (C-FLAG1, C-FLAG2) of a result flag class for each result flag. Multiple result flags for one InfoCourse 300 (record) are connected in a ring structure 800. The ring structure 800 relates 330, 320 to the corresponding IC-anchor 310. Advantageously, a docket element (D-FLAG) is used. The docket element represents a counterpart of the IC-anchor 310 on the side of the result flags. One advantage is that the docket element is decoupled from the IC-anchor in the sense that it is derived from a different class than the IC-anchor. Therefore, it can provide different functions than the IC-anchor. These functions can be used by the other result flags because the docket element is instantiated from the same class as the result flags. The decoupling allows instances from the result flag class to consume less memory than a corresponding IC-anchor that has, for example, more pointers, additional administrative information (e.g., number of elements in a substructure), methods that operate on attributes, such as "sort elements" or "balance tree", etc. The docket element D-FLAG has a docket pointer 330 pointing at the corresponding IC-anchor 310, whereas the IC-anchor 310 has an anchor pointer 320 pointing at the corresponding docket element. Using the ring structure 800 the data storage system can quickly identify any result flag related to a specific IC-anchor.

To summarize, each InfoCourse has one IC-anchor that relates to a corresponding docket element. That is, an InfoCourse (record) 300 is represented by an IC-anchor 310 and the corresponding docket element D-FLAG. The docket element is the docking point for the result flags C-FLAG1, C-FLAG2. A result flag semantically plays the role of a dynamic flag. If a result flag is connected to a docket element, the InfoCourse, which is represented by the docket element, has been selected. That is, it fulfils one ore more conditions of the original query.

Multiple result flags that relate to different IC-anchors may be linked together in a pointer list by means of pointers (e.g., pUp and pDown). This is also valid for the docket elements, since technically speaking they are also instances of the result flag class. A linear list of result flags is called a result set. Each result set is identified by a result ID. A result set flags a subset of InfoCourses that comply with at least portion of the Boolean expression 500 in the query.

In the example, the first result set 361 is implemented by the first pointer list PL-1 that includes the result flag pointers C-FLAG1 and has the result ID 351. The second result set 362 is implemented by the second pointer list PL-2 that includes the result flag pointers C-FLAG2 and has the result ID 352. The docking elements formally are also linked in a pointer list PL-D having its own result ID 350.

Several result sets may exist simultaneously. On the level of a docket element D-FLAG, the result flags can be linked in the circular structure 800 using pointers, such as pointer pSmallId and pointer pLargeId. The pointer names indicate that the result flags in the circular structure 800 can be sorted by result ID. The circular structure 800 can be run through in both directions, e.g. to find the result flag of a particular result set. Sorting the result flags in the circular structure 800 by result ID helps to decide in which direction the circular structure should be searched for a fast identification of a certain result ID.

FIGS. 13 and 14 describe an implementation for applying the Boolean OR and AND operators to two result sets. These operators may be combined with a Boolean NOT operator. In this case, the data storage system runs through the docket elements of all IC-anchors and instantiates a result flag in a new result set each time when there is no result flag in the original result set where the NOT operator is applied to. At the end of the procedure the original result set is not used any more and can be deleted. Note that the InfoCourses are not needed to perform the inversion. Only the IC-anchors are used.

The number of hits as well as some or all of the InfoCourses that match the query may be returned to an application. As an example, assume that 20.000 InfoCourses are found. That is, the final result set contains 20.000 result flags. If an application requests the next 20 InfoCourses after the 5.390th InfoCourse from the data storage system, then the request can be satisfied by using the final result set. The result flag 5.390 (offset) is located by running down the final result set and counting the result flags until the offset result flag at position 5.390 is reached. The next 20 InfoCourses are read from the corresponding tree structures (e.g., by using the IC-anchors that relate to the corresponding docket elements). The retrieved values may be serialized, for example, into a Send-Buffer-Structure or any other kind of appropriate communication data structure. Any type of transport format and/or rearrangement, concatenation, etc. of data may be used for the Send-Buffer-Structure (e.g., the use of fixed lengths). Preferably, the application knows the data format provided by the data storage system to ensure stable communication.

For a fast localisation of a specific InfoCourse (e.g., number 5.390) it is useful to subdivide a result set into Intervals. One can use an interval pointer which points to the result flag in the middle of the result set (e.g., result flag 10.000 of 20.000) or to any other sub-interval of the result set, such as quarters. According to the offset requested by the application the data storage system can jump to the nearest interval pointer and then sequentially run through only a part of the result set (e.g., upwards or downwards) and count until the requested result flag (e.g., docket element D-FLAG) has been reached. It is useful to choose the direction having the shortest distance to the requested offset position. For example, assume that there are 20.000 result flags in the result set. If InfoCourse 15.390 is requested as an offset and no interval pointers are available, then it is advantageous to start at the bottom of the result set (result flag 20.000) and run through 20.000−15.390+1=4.611 result flags instead of starting at the top and run through 15.390 result flags. The same is true when using interval pointers.

For example, the above describe implementation may correspond to the algorithm An (cf. FIG. 4). To achieve the best data retrieval performance, it can be advantageous to use this algorithm An when the current value of the number of hits (e.g., pc; cf. FIG. 4) is below the threshold value B(n) (cf. FIG. 4) in the "number of hits" dimension and the complexity of the Boolean expression is in the interval [B'(n−1), B'(n)] of the second dimension. The second dimension parameter p' in FIG. 4, therefore, reflects the complexity of the Boolean statement in this example. The threshold value B'(n) may be defined through a Boolean AND expression including a single condition portion ("single-condition-Boolean-AND").

In the previously explained general result flag instance based implementation, the Boolean AND operator was applied to two result sets. In another implementation a "Lean AND" can be implemented in case only one result set exists as a result of one portion of the Boolean expression and this result set is to be combined with a single condition through a Boolean AND operator (Boolean AND expression). The Query may have a syntax like: (<complex Subquery>) AND condition C1. Also for multiple non-nested conditions combined with AND at the same bracket level the "Lean AND" can be used. A syntax example for this kind of flat Boolean expression is: C1 AND C2 AND . . . AND Cn, where Cn are conditions.

This "Lean AND" implementation may, for example, correspond to the algorithm A'n (cf. FIG. 4). To achieve the best data retrieval performance, it can be advantageous to use the algorithm A'n at the "number of hits" value pc when the complexity of the Boolean AND expression is below a certain threshold value (e.g., in the second dimension interval [B'(n), B'(n+1)], cf. FIG. 4).

In the above examples, only one result set exists and one or more conditions are to be combined with the Boolean AND operator.

Assume a Boolean expression, such as:

C1 AND C2 AND . . . AND Cn.

As explained before, the data storage system 902 is able to quickly find out which of the conditions C1 to Cn has the lowest number of hits, that is, the highest selectivity. The total number of hits in the intersection set of all conditions cannot be larger than the number of hits for the condition with the highest selectivity.

Therefore, the data storage system creates a result set for the condition with the highest selectivity, then runs through all result flags of the result set and checks for each result flag if the remaining conditions are fulfilled by the corresponding InfoCourse or not. In this implementation the InfoCourses are needed to check, for example, a condition NAME_FIRST='Peter'. The data storage system uses the relation from the result flag through the docking element to the corresponding IC-anchor, which points at the corresponding InfoCourse. The corresponding InfoCourse tree is then searched for the InfoType values according to the remaining conditions.

In this implementation, a second result set is not needed to be checked against the result set because the checking is directly performed on the related InfoCourses. As a consequence, the time to instantiate all the result flags of a second result set is saved by directly searching the InfoCourses matching the result set (already the most selective Condition) and checking directly if the corresponding values match or not.

For each result flag this check is performed for one or more conditions. For example, in a query C1 AND C2 AND C3 AND C4, a result set is instantiated for the most selective condition and for each result flag the three other conditions are checked accordingly. If at least one condition does not match, the corresponding result flag is deleted from the result set and the result counter is adjusted accordingly.

Finally, the result set flags all matching InfoCourses (records) and the result counter has the correct number of hits, which may be reported to an application.

For example, the "Lean AND" implementation can be advantageous when the time to instantiate the result flag instances of the second result flag exceeds the time to check the corresponding InfoCourses.

If the Boolean expression has only one single condition, result sets are not necessary. Result sets become valuable in case of a combination of several conditions in a corresponding query. In the particular case of only one condition the count result for the total number of hits is obtained by means of the tree structures as described in FIGS. 5 to 11. If InfoCourses have to be returned to an application, this can also be done by using the tree structures. Instead of a result set identifying the matching InfoCourses the tree nodes as such are used. For example, instead of running through a result set to visit all matching InfoCourses and collect the data into a Send-Buffer-Structure, only the matching sub-tree structures identified by the corresponding start pointers are traversed. As soon as the offset InfoCourse is found, only the number of InfoCourses has to be visited that is to be returned. For example, when 10 InfoCourses have to be returned to an application, only 10 nodes from the offset InfoCourse on have to be traversed in the corresponding InfoType sub-tree. From each node in an InfoType tree the corresponding anchor object can be reached, and from the anchor each attribute value of the given InfoCourse can be reached.

Figure 17:
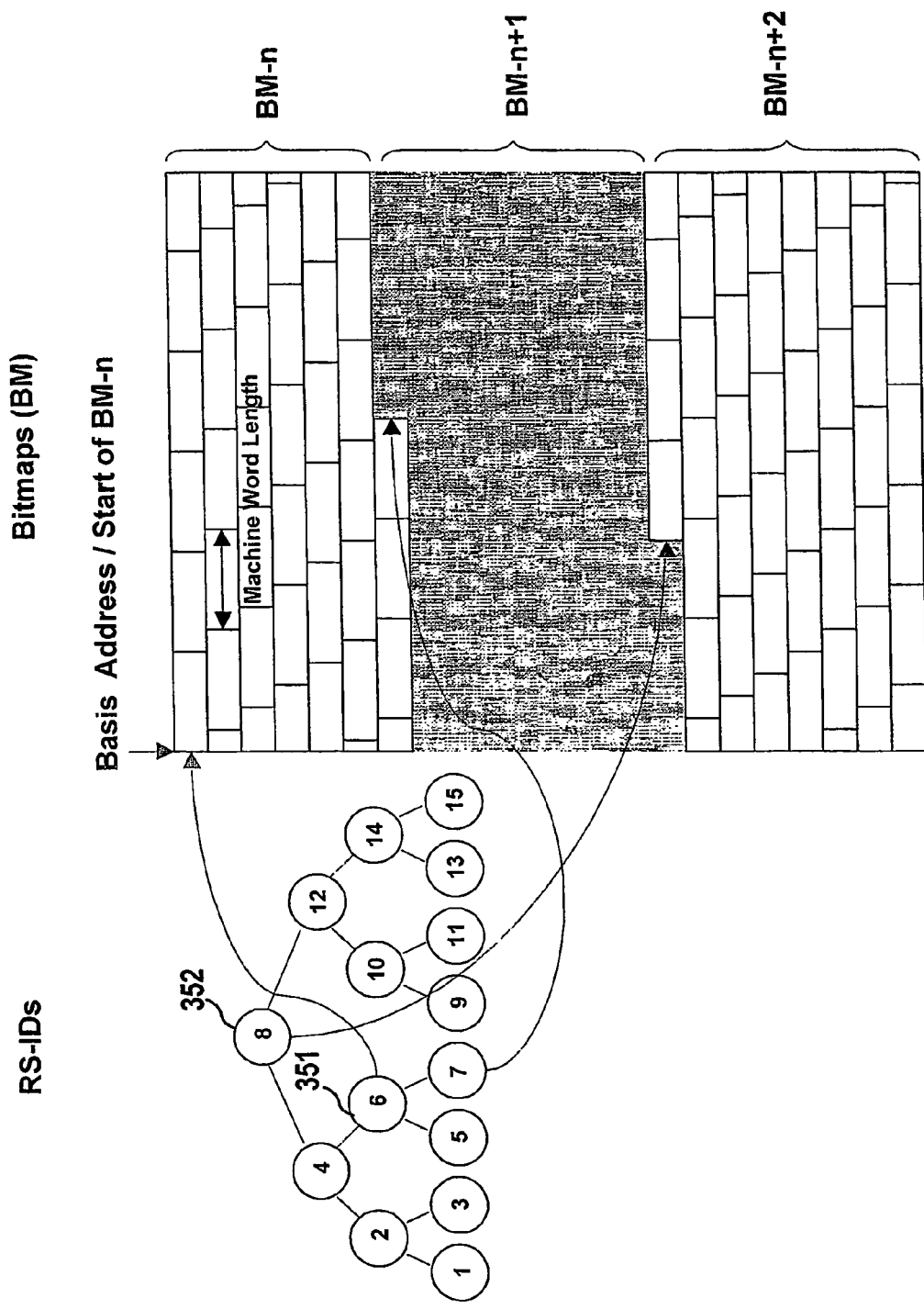
FIG. 17 illustrates a second implementation for the result flags and the result sets.
Figure 18:
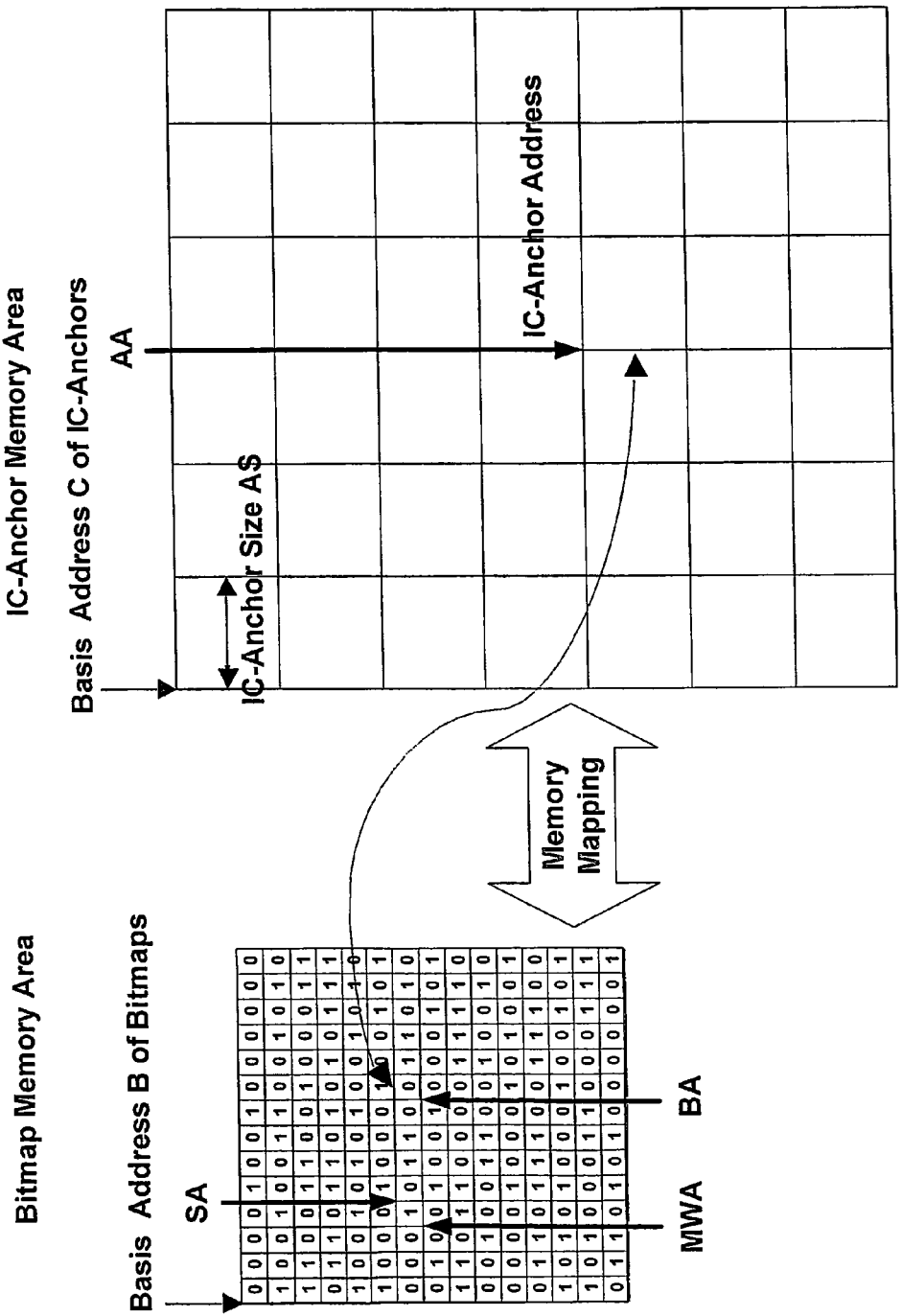
FIG. 18. illustrates how result flags relate to corresponding IC-anchors in the second implementation.

FIGS. 16 to 18 illustrate a second implementation for the result flags C-FLAG1, C-FLAG2 and the result sets leading to a second algorithm for the data retrieval task.

This second implementation is appropriate for very large result sets, where the first implementation would require many result flag instances eating up a lot of memory space of the data storage system.

FIG. 17 illustrates three bitmaps BM-n, BM-n+1, BM-n+2. In the example, the start of bitmap BM-n coincides with the basis address of bitmaps in the memory of the data storage system.

For example, a first bitmap BM-n corresponds to the first result set 361 and a second bitmap BM-n+2 corresponds to the second result set 362. The result flags C-FLAG1, C-FLAG2 are implemented as bits in the respective bitmaps.

A bitmap in general consists of multiple machine words. Depending on the hardware architecture of the data storage system, a machine word can consist, for example, of 32 or 64 bits. The second implementation also works with any other machine word length, such as 128 bit or more. A bitmap is a contiguous concatenation of machine words in a sufficiently large area of the data storage system memory. The number of bits in a (result set) bitmap corresponds to the number of IC-anchors of the InfoCourses selected by the Boolean expression 500. Therefore, each bitmap has the maximum size of a result set. Multiple bitmaps can simultaneously exist in the memory. Each bitmap (result set) is identified by a corresponding result ID. Each result ID points to the start address of its corresponding bitmap. For example, the first result ID 351 and the second result ID 352 point to the start address of the first bit map BM-n and the second bit map BM-n+2, respectively.

Assume, 5 million records (InfoCourses) are loaded into the tree structures of the data storage system. Therefore, 5 million IC-anchors exist and, in this example, one bitmap includes 5 million bits (one Bit per IC-anchor). The bitmap occupies 5.000.000/8=625.000 bytes 610 KB. The 5 million bits correspond to 5.000.000/64=78.125 machine words on a 64 Bit hardware platform and to 5.000.000/32=156.250 machine words on a 32 Bit hardware platform. This example shows that a bitmap can be made up of tens of thousands or even more machine words. The number of machine words in a Bitmap is only physically limited by the size of the available main memory and the addressability of the main memory.

That is, each Bitmap may consist of a theoretically unlimited number of machine words, where the length of a machine word depends on the given hardware platform and/or the operating system of the data storage system. Each bitmap is referenced by a result ID. Preferably, the result IDs 351, 352 are stored in a tree structure allowing direct access to the start address of the corresponding bitmap via a pointer. In general, any structure (e.g., a linear list) can be used to administrate the result IDs. However, for large numbers of result IDs the access to a specific result set is more efficient when using a tree structure than when using a linear list or another structure.

When the start address of a specific bitmap has been found, this specific bitmap can be used to count the number of hits (number of result flags) or to return data to an application.

In the second implementation, each bitmap has a counter counting the Number of result flags, that is, the number of bits set to 1. To count the number of hits, the data storage system can run through all machine words of the bitmap. If a machine word has a value of zero, then all bits of the machine word are zero and the next machine word can be checked. For machine words having a value different from zero the data storage system determines the number of bits that are set to 1. This can be achieved by known methods, such as, shifting the bits of a machine word into one direction, testing with bit masks performing a bit by bit AND operation, etc. Each time a bit is set to 1, the counter is increased by 1. At the end of the procedure the counter value corresponds to the number of bits set to 1 and, therefore, the number of result flags in the corresponding result set.

FIG. 18 illustrates how result flags relate to corresponding IC-anchors in the second implementation using memory mapping. The shown bits in the bitmap memory represent only a portion of the bitmap memory area.

In contrast to the first implementation, bits of a bitmap and the corresponding IC anchors are not linked by pointers.

However, IC-anchors and their corresponding bits are related by a memory mapping rule using relative addresses. A memory manager of the data storage system can ensure that the IC-anchors and the bitmaps reside in contiguous memory areas. The data storage system can then locate any IC-anchor that relates to a specific bit in a bitmap.

For retrieving data (InfoCourses) in response to a query the data storage system identifies the corresponding IC-anchors. Using the IC-anchor and the corresponding InfoCourse tree a specific node in an InfoType tree can be found and the value can be read from the node. The value can then be copied, for example, to a Send-Buffer-Structure as described earlier. To locate the specific bit that corresponds to the identified IC-anchor the data storage system can use an algorithm that works with relative addresses.

A specific bit is part of a machine word. Assume that this specific bit is bit number K. The machine word has a memory address MWA. The whole bitmap has a start address SA. For example, the relative address of the specific bit is calculated as BA=(MWA−SA)*64+K for 64 Bit long machine words and BA=(MWA−SA)*32+K for 32 Bit long machine words. At this memory location, the specific bit of the Bitmap can be checked. If it is set to 1, the InfoCourse with the corresponding IC-anchor is part of the result set.

The IC-anchor can be found in the IC-anchor memory area in the following way. All IC-anchors reside in the IC-anchor memory area with the basis address C. The size AS of an IC-anchor is known. Therefore, the IC-anchor address AA of the specific IC-anchor can be calculated as AA=C+BA*AS. Therefore, a pointer that is set to the address AA points to the requested IC-anchor.

When creating a result set bitmap in compliance with a portion of the Boolean expression, the result flag bits that relate to IC-anchors of the corresponding InfoCourses are set to 1. This can also be achieved by using relative addresses.

Each IC-anchor has a memory address AA. The basis address of the IC-anchor memory area is C. By knowing the size AS of an IC-anchor, the IC-anchor position number can be calculated as BA=(AA−C)/AS. That is, the result flag bit for the BAth IC-anchor is to be located in the bitmap memory area. The start address of a specific bitmap (result set identified by result ID) is SA. The machine word address MAW where the bit is located is calculated as MAW=SA+BA div 64 on a 64 bit hardware platform and MAW=SA+BA div 32 on a 32 bit hardware platform, where the div operator divides one integer number by another integer number and returns the integer part of the result. Within the identified machine word at MAW the Kth bit has to be set to 1 with K=BA mod 64 on a 64 bit hardware platform and K=BA mod 32 on a 32 bit hardware platform, where the mod operator divides two integer numbers and returns only the remainder. Alternatively, K could also be calculated as: K=BA−(MAW−SA)*BS, where $2^{BS}$ is the addressable number of bits in the used hardware platform/operating system.

Figure 19:
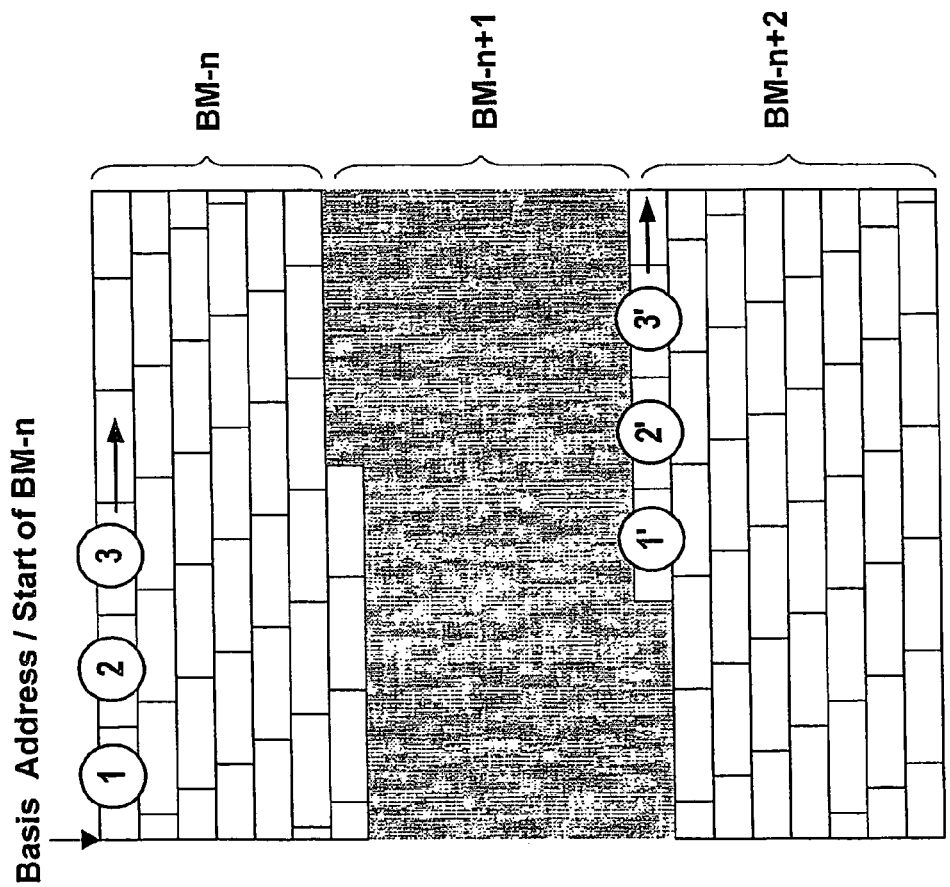
FIG. 19 illustrates, how Boolean operators can be applied to the result sets in the second implementation.

FIG. 19 illustrates, how AND/OR/NOT operators can be applied to the first and second bitmap BM-n, BM-n+2 by sequentially combining the corresponding pairs of machine words. The machine words are illustrated by cycles with a number that corresponds to the position of the machine word within its bitmap.

Machine word 1 of the first bitmap BM-n is combined with machine word 1' of the second bitmap BM-n+2. This is repeated for all pairs of machine words (2,2'), (3,3'), and so on, with respect to the first and second bitmaps. Since all IC-anchors are represented by a corresponding bit in each of the bitmaps, all bitmaps have the same size and, thus, contain the same number of machine words.

The logical combination of pairs of machine words by applying the Boolean AND or OR operators can be performed as a bit by bit AND or OR operation. Usually, the CPU (processor) can perform this in one processing cycle. Programming languages, such as C++, offer commands for this kind of bit by bit operations.

The result of the combination of first and second result set bitmaps may be written to a new, third bitmap (e.g., BM-n+1) or to one of the two original bitmaps BM-n, BM-n+2. This depends on whether the original bitmaps may be overwritten or are to be kept for later use.

After the processing of each pair of machine words the result flag counter counts how many bits are set to 1 in the resulting machine word. The sum of the counting results for all machine words of the resulting bitmap corresponds to the total number of bits set to 1 in the resulting bitmap and may be reported to an application as the number of hits.

The application of the Boolean NOT operator to a bitmap is performed as a bit by bit NOT operation applied to each machine word in the bitmap. Again, the result may overwrite the original bitmap or can be written to another bitmap if the original bitmap has to be kept for later use.

The so far described bit map implementation may correspond to the algorithm A(n+1) (cf. FIG. 4) that has a better performance than the algorithm An in case the number of hits pc exceeds the threshold value B(n) and the complexity of the Boolean expression is in the interval [B'(n−1), B'(n)].

The "Lean AND", as described under FIG. 16, only needs one result set and can also be implemented when using bitmaps. The bit map "Lean AND" implementation may correspond to the algorithm A'(n+1) (cf. FIG. 4) that is to be used when the complexity of the Boolean AND expression is in the interval [B'(n), B'(n+1)] in the complexity dimension and the current number of hits is in the interval [B(n), B(n+1)].

For example, the Boolean expression includes five conditions that are combined by Boolean AND operators: C1 AND C2 AND C3 AND C4 AND C5. A result set bitmap is set up (as described in FIGS. 13, 14) for the condition with the highest selectivity of all conditions included in the Boolean expression. Then the data storage system runs through the bitmap from the first to the last bit. For each bit that is set to 1 the data storage system jumps to the corresponding InfoCourse and checks if all other Conditions are fulfilled by the corresponding InfoCourse. This check is performed in the same way as described in the implementation using result flag instances (cf. FIG. 16). If all conditions are true the bit keeps its value 1, otherwise the bit is set to 0. When a bit is set to 0, the corresponding result counter containing the number of bits that are set to 1 is reduced by 1. Therefore, the result counter contains always the current number of hits.

Alternatively, instead of getting the number of hits from the initial bitmap and reducing the counter each time a bit is set to 0 when an InfoCourse does not match the other conditions, the counter may also count the number of bits that are set to 1 in the bitmap after the "Lean AND" has been applied.

Figure 20:
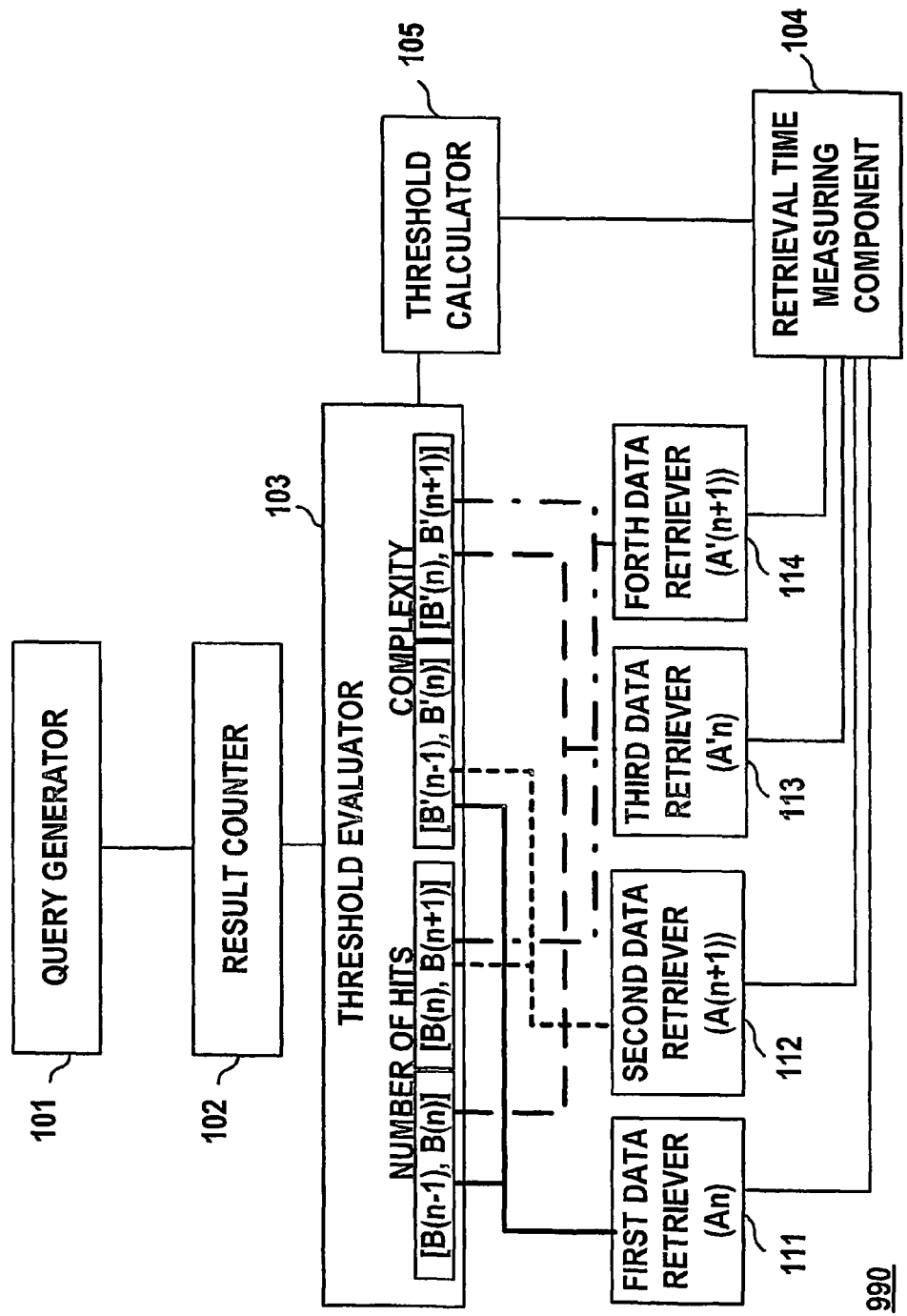
FIG. 20 is a simplified block diagram of software components of the computer system to dynamically select a data retriever implementation.

FIG. 20 is a simplified block diagram of software components of the computer system 990 that can be used with an embodiment of the invention to dynamically select a data retriever implementation in dependence of a specific environment. In the example, the data retriever implementations 111, 112, 113, and 114 are characterized by their respective algorithms An, A(n+1), A'n, and A'(n+1).

A result set may potentially contain millions of result flags given a sufficiently large number of infoCourses loaded. Using the first or third data retriever 111, 113, for example, on a 64 bit architecture one pointer address occupies already 64 Bit (8 Bytes). Each result flag has at least two pointers plus the content of the result flag. Therefore, one result flag may occupy several hundreds of bytes. In this case, one result set containing some millions of result flags occupies memory space in the range of up to several hundreds of megabytes. This is in addition to the memory space occupied by the tree structures that also reside in main memory. Further, as the data storage system using the first or third data retriever 111, 113 processes the result sets sequentially and checks result flag instance by result flag instance to perform AND/OR combinations, this may lead to processing times of several seconds for one combination when applied to very large result sets (e.g., several millions of result flag instances). One can apply an appropriate parallelisation to the first implementation or use the second implementation to overcome these issues.

The second and forth data retriever implementations 112, 114 use bitmaps for result sets. Bitmaps are a representation of result sets that consumes considerably less memory space than the result sets of the first and third data retrievers. Further, bit by bit Operations are performed very fast and can usually be handled in one CPU processing cycle per machine word, if supported by a programming language, such as C++.

For very large result sets, such as several millions of hits (e.g., in the interval [B(n), B(n−1)]), it can be more time saving to perform Boolean combinations of result sets using bitmaps instead of pointer lists of result flag instances. Already the instantiation of millions of result flag instances may last several seconds if parallelisation is not used. In addition the time for performing the Boolean combination has to be considered. The Boolean combination of result flag instances is performed one by one at the instance level.

However, when a result set contains only a small number of hits (e.g., in the interval [B(n−1), B(n)]) then bitmaps may be "almost empty". That is, only a small number of bits is set to 1 in a large number of machine words (e.g., for 5 million InfoCourses a bitmap includes 78.125 machine words on a 64 bit platform). In a bad case only one bit is set to 1 in each machine word. Therefore, for small result sets the use of result flag instances may be advantageous.

Within the corresponding intervals in the "number of hits" dimension the further performance dependency on the complexity of the Boolean statement exists. This dependency has already been explained under FIGS. 16 to 19.

The computer program product components in FIG. 20 allow the data storage system to switch from one data retriever implementation to another if the other implementation uses an algorithm that is more advantageous in a specific environment. For example, this can be achieved by transforming pointer lists of the first implementation into bitmaps of the second implementation and vice versa. For these transformations the above explained procedures for creating result flag instances and for creating bitmaps can be used.

The data storage system decides by itself when it is appropriate to use an implementation that is useful for small result sets having a number of result flags below a threshold value (e.g., up to several thousand elements) or an implementation having a number of result flags above the threshold value. For each of these cases the data storage system further decides whether the corresponding "Lean AND" algorithm A'n, A'(n+1) or the more general algorithms An, A(n+1) is advantageously used.

This enables the data storage system to automatically select the algorithm, which is best in terms of memory consumption and performance in a specific situation. If a current value of one dimension equals a threshold value of this dimension, then it is not important, whether the algorithm for the interval above or below the threshold value is used because, preferably, the threshold value is defined as the breakeven points for the two algorithms.

In the example, the threshold value in the "number of hits" dimension may be the break even point being defined as the number of result flags in a result set, where the use of result flag instances leads to the same system performance as the use of bitmaps. The data storage system can determine the threshold value dynamically, for example, by appropriate time measurements. Therefore, on a given technology platform for a given data volume, data value distribution, etc., the appropriate value for the threshold value can be used in a stable environment at all times.

The query generator 101 generates the query that includes the Boolean expression 500. For example, the query generator can be implemented on the front end computing device 901. The query generator 101 can also be part of an application that runs on any other computing device of the computer system 990.

Once the data storage system 902 receives the Boolean expression through a corresponding interface, the result counter 102 determines the corresponding number of hits. Preferably, the result counter is implemented in the data storage system 902.

The threshold evaluator 103 is able to perform multidimensional comparisons. In other words, the threshold evaluator can compare the current number of hits with the intervals [B(n−1), B(n)] and [B(n), B(n+1)] and, substantially simultaneously, the complexity of the Boolean expression with the intervals [B'(n−1), B'(n)] and [B'(n), B'(n+1)]. FIG. 2 explains details about how to initialise the threshold values defining the intervals.

In case the number of hits (result flags) is in the interval [B(n−1), B(n)] and the Boolean expression is a complex Boolean expression from the interval [B'(n−1), B'(n)], the data storage system uses the first data retriever 111. This case is illustrated by bold solid connection lines between the threshold evaluator and the first data retriever.

In case the number of hits (result flags) is in the interval [B(n), B(n+1)] and the Boolean expression is a complex Boolean expression from the interval [B'(n−1), B'(n)], the data storage system uses the second data retriever 112. This case is illustrated by bold dotted connection lines between the threshold evaluator and the second data retriever.

In case the number of hits (result flags) is in the interval [B(n−1), B(n)] and the Boolean expression includes a "single-condition-Boolean-AND" expression from the interval [B'(n), B'(n+1)], the data storage system uses the third data retriever 113. This case is illustrated by bold dashed connection lines between the threshold evaluator and the second data retriever.

In case the number of hits (result flags) is in the interval [B(n), B(n+1)] and the Boolean expression includes a "single-condition-Boolean-AND" expression from the interval [B'(n), B'(n+1)], the data storage system uses the forth data retriever 114. This case is illustrated by bold dotted-dashed connection lines between the threshold evaluator and the second data retriever.

The retrieval time measuring component 104 of the data storage system can measure the time that is consumed by either data retriever implementation.

The threshold calculator 105 can dynamically determine (re-calculate) the threshold values of the various dimensions on the basis of the time measurements with respect to the four data retriever implementations. The recalculated threshold values can be fed into the threshold evaluator 103 and used for the next query.

In general, there can be more threshold values that correspond to even more data retrievers for even more dimensions. That is, there can be further dependencies on further parameters that are considered by the threshold evaluator for selecting the appropriate data retriever.

Embodiments of the invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

Although an embodiment of the invention has been described in detail using a data storage system having a plurality of data retrieval algorithms, the invention is not limited to this embodiment. Rather, other software applications making use of the spirit of the invention as broadly described by the claims are considered to be within the scope of the invention.

The invention claimed is:

1. A method comprising:

calculating a first threshold value for a first parameter and a second threshold value for a second parameter, the first parameter and the second parameter influencing the performance of a software application with regards to a specific task, the first threshold value separating a first value range of the first parameter into two intervals of a first dimension and the second threshold value separating a second value range of the second parameter into at least two intervals of a second dimension;

comparing the first threshold value to a corresponding current value of the first parameter and the second threshold value to a corresponding current value of the second parameter;

selecting, using one or more processors, an algorithm from a plurality of algorithms for performing the task in accordance with the result of the comparing step, the selected algorithm assigned to an intersection of the interval of the first dimension that includes the corresponding current parameter value of the first dimension and the interval of the second dimension that includes the corresponding current parameter value of the second dimension;

determining a number of hits in response to a Boolean expression;

comparing the number of hits with the first threshold value of the first dimension and comparing the complexity of the Boolean expression with a second threshold value of the second dimension;

retrieving the data using a first data retriever in case the number of hits is below the first threshold value of the first dimension and the complexity of the Boolean expression is above the second threshold value of the second dimension;

retrieving the data using a second data retriever in case the number of hits is above the first threshold value of the first dimension and the complexity of the Boolean expression is above the second threshold value of the second dimension;

retrieving the data using a third data retriever in case the number of hits is below the first threshold value of the first dimension and the complexity of the Boolean expression is below the second threshold value of the second dimension;

retrieving the data using a fourth data retriever in case the number of hits is above the first threshold value of the first dimension and the complexity of the Boolean expression is below the second threshold value of the second dimension;

measuring the time that is consumed by a selected data retriever for various numbers of hits; and dynamically determining the first threshold value and the second threshold value on the basis of results of the measuring, the first data retriever, the second data retriever, the third data retriever, or the fourth data retriever being at least one of general data retrieval algorithm using result flag instances, a general data retrieval algorithm using bit maps, a lean AND data retrieval algorithm using result flag instances, and a lean AND data retrieval algorithm using bit maps.

2. The method of claim 1, further comprising:

measuring the performance of the selected algorithm;

checking whether the selected algorithm delivers the better performance within the plurality of algorithms; and recalculating at least the first threshold value if a further algorithm of the plurality of algorithms performs better in the intersection including the current parameter values of the first dimension and the second dimension, the recalculation performed so that the further algorithm gets automatically selected in the intersection defined by the at least one recalculated threshold value.

3. The method claim 1, wherein each threshold value corresponds to a break-even point where two neighbouring algorithms have the same performance with respect to the corresponding dimension.

4. The method of claim 1, wherein the retrieving of the data in case the number of hits is below the first threshold value of the first dimension and the complexity of the Boolean expression is above the second threshold value of the second dimension is performed using a general data retrieval algorithm using result flag instances.

5. The method of claim 1, wherein the retrieving of the data in case the number of hits is above the first threshold value of the first dimension and the complexity of the Boolean expression is above the second threshold value of the second dimension is performed using a general data retrieval algorithm using bit maps.

6. The method of claim 1, wherein the retrieving of the data in case the number of hits is below the first threshold value of the first dimension and the complexity of the Boolean expression is below the second threshold value of the second dimension is performed using a lean AND data retrieval algorithm using result flag instances.

7. The method of claim 1, wherein the retrieving of the data in case the number of hits is above the first threshold value of the first dimension and the complexity of the Boolean expression is below the second threshold value of the second dimension is performed using a lean AND data retrieval algorithm using bit maps.

8. A system comprising:

a memory to store variables for a first threshold value for a first parameter and at least a second threshold value for at least a second parameter, the first parameter and the second parameter influencing the performance of a software application with regards to a specific task, the first threshold value separating a first value range of the first parameter into two intervals of a first dimension and the second threshold value separating a second value range of the second parameter into two intervals of a second dimension, the first parameter value and the second parameter value having initial values set by running test cases for a plurality of algorithms for performing the specific task;

a threshold evaluator, having one or more processors, to compare the first threshold value to a corresponding current value of the first parameter and the second threshold value to a corresponding current value of the second parameter, one of the two intervals of the first dimension including the corresponding current value of the first parameter and one of the two intervals of the second dimension including the corresponding current value of the second parameter defining an intersection, the intersection being used by the software application to select an algorithm assigned to the intersection from the plurality of algorithms for performing the specific task in accordance with the result of comparison;

a result counter to determine a number of hits in response to a Boolean expression;

the threshold evaluator further to compare the number of hits with the first threshold value of the first dimension and comparing the complexity of the Boolean expression with a second threshold value of the second dimension;

a first data retriever to retrieve the data in case the number of hits is below the first threshold value of the first dimension and the complexity of the Boolean expression is above the second threshold value of the second dimension;

a second data retriever to retrieve the data in case the number of hits is above the first threshold value of the first dimension and the complexity of the Boolean expression is above the second threshold value of the second dimension;

a third data retriever to retrieve the data in case the number of hits is below the first threshold value of the first dimension and the complexity of the Boolean expression is below the second threshold value of the second dimension;

a fourth data retriever to retrieve the data using a fourth data retriever in case the number of hits is above the first threshold value of the first dimension and the complexity of the Boolean expression is below the second threshold value of the second dimension;

a retrieval time measuring component to measure the time that is consumed by a selected data retriever for various numbers of hits; and a threshold calculator to dynamically determine the first threshold value and the second threshold value on the basis of results of the measuring, the first data retriever, the second data retriever, the third data retriever, or the fourth data retriever being at least one of general data retrieval algorithm using result flag instances, a general data retrieval algorithm using bit maps, a lean AND data retrieval algorithm using result flag instances, and a lean AND data retrieval algorithm using bit maps.

9. The system of claim 8, further comprising:

a threshold calculator to recalculate at least one of the first threshold value and the second threshold value if a further algorithm of the plurality of algorithms performs better in the intersection including the corresponding current value of the first parameter and the corresponding current value of the second parameter, wherein the recalculation is performed so that the further algorithm is automatically selected in the intersection defined by the at least one recalculated threshold value.

10. The system of claim 8, wherein each of the first threshold value and the second threshold value corresponds to a break-even point where two neighbouring algorithms have the same performance with respect to the corresponding dimension.

11. The system of claim 8, wherein the first data retriever is further to retrieve the data in case the number of hits is below the first threshold value of the first dimension and the complexity of the Boolean expression is above the second threshold value of the second dimension is performed using a general data retrieval algorithm using result flag instances.

12. The system of claim 8, wherein the second data retriever is further to retrieve the data in case the number of hits is above the first threshold value of the first dimension and the complexity of the Boolean expression is above the second threshold value of the second dimension is performed using a general data retrieval algorithm using bit maps.

13. The system of claim 8, wherein the third data retriever is further to retrieve the data in case the number of hits is below the first threshold value of the first dimension and the complexity of the Boolean expression is below the second threshold value of the second dimension is performed using a lean AND data retrieval algorithm using result flag instances.

14. The system of claim 8, wherein the fourth data retriever is further to retrieve the data in case the number of hits is above the first threshold value of the first dimension and the complexity of the Boolean expression is below the second threshold value of the second dimension is performed using a lean AND data retrieval algorithm using bit maps.

15. A non-transitory machine-readable medium having instructions embodied thereon that when executed by one or more processors, cause the one or more processors to perform a method, the method comprising:

calculating a first threshold value for a first parameter and a second threshold value for a second parameter, the first parameter and the second parameter influencing the performance of a software application with regards to a specific task, the first threshold value separating a first value range of the first parameter into two intervals of a first dimension and the second threshold value separating a second value range of the second parameter into at least two intervals of a second dimension;

comparing the first threshold value to a corresponding current value of the first parameter and the second threshold value to a corresponding current value of the second parameter; and selecting, using one or more processors, an algorithm from a plurality of algorithms for performing the task in accordance with the result of the comparing step, the selected algorithm assigned to an intersection of the interval of the first dimension that includes the corresponding current parameter value of the first dimension and the interval of the second dimension that includes the corresponding current parameter value of the second dimension;

determining a number of hits in response to a Boolean expression;

comparing the number of hits with the first threshold value of the first dimension and comparing the complexity of the Boolean expression with a second threshold value of the second dimension;

retrieving the data using a first data retriever in case the number of hits is below the first threshold value of the first dimension and the complexity of the Boolean expression is above the second threshold value of the second dimension;

retrieving the data using a second data retriever in case the number of hits is above the first threshold value of the first dimension and the complexity of the Boolean expression is above the second threshold value of the second dimension;

retrieving the data using a third data retriever in case the number of hits is below the first threshold value of the first dimension and the complexity of the Boolean expression is below the second threshold value of the second dimension;

retrieving the data using a fourth data retriever in case the number of hits is above the first threshold value of the first dimension and the complexity of the Boolean expression is below the second threshold value of the second dimension;

measuring the time that is consumed by a selected data retriever for various numbers of hits; and dynamically determining the first threshold value and the second threshold value on the basis of results of the measuring, the first data retriever, the second data retriever, the third data retriever, or the fourth data retriever being at least one of general data retrieval algorithm using result flag instances, a general data retrieval algorithm using bit maps, a lean AND data retrieval algorithm using result flag instances, and a lean AND data retrieval algorithm using bit maps.

16. The non-transitory machine-readable medium of claim 15, wherein the retrieving of the data in case the number of hits is below the first threshold value of the first dimension and the complexity of the Boolean expression is above the second threshold value of the second dimension is performed using a general data retrieval algorithm using result flag instances.

17. The non-transitory machine-readable medium of claim 15, wherein the retrieving of the data in case the number of hits is above the first threshold value of the first dimension and the complexity of the Boolean expression is above the second threshold value of the second dimension is performed using a general data retrieval algorithm using bit maps.

18. The non-transitory machine-readable medium of claim 15, the retrieving of the data in case the number of hits is below the first threshold value of the first dimension and the complexity of the Boolean expression is below the second threshold value of the second dimension is performed using a lean AND data retrieval algorithm using result flag instances.

19. The non-transitory machine-readable medium of claim 15, the retrieving of the data in case the number of hits is above the first threshold value of the first dimension and the complexity of the Boolean expression is below the second threshold value of the second dimension is performed using a lean AND data retrieval algorithm using bit maps.

* * * * *